(12) United States Patent
Nakanishi et al.

(10) Patent No.: US 10,620,483 B2
(45) Date of Patent: Apr. 14, 2020

(54) METHOD OF PRODUCING LIQUID CRYSTAL PANEL

(71) Applicant: Sharp Kabushiki Kaisha, Sakai, Osaka (JP)

(72) Inventors: Youhei Nakanishi, Sakai (JP); Masayuki Kanehiro, Sakai (JP); Shota Okamoto, Sakai (JP); Shinsuke Maeda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/085,601

(22) PCT Filed: Mar. 23, 2017

(86) PCT No.: PCT/JP2017/011640
§ 371 (c)(1),
(2) Date: Sep. 17, 2018

(87) PCT Pub. No.: WO2017/170099
PCT Pub. Date: Oct. 5, 2017

(65) Prior Publication Data
US 2019/0033638 A1    Jan. 31, 2019

(30) Foreign Application Priority Data
Mar. 30, 2016  (JP) ................... 2016-067276

(51) Int. Cl.
*G02F 1/1339*  (2006.01)
*G09F 9/00*    (2006.01)
(Continued)

(52) U.S. Cl.
CPC .......... *G02F 1/1339* (2013.01); *G02F 1/1341* (2013.01); *G02F 1/1343* (2013.01);
(Continued)

(58) Field of Classification Search
CPC ..................................................... G02F 1/1339
See application file for complete search history.

(56) References Cited

U.S. PATENT DOCUMENTS

2007/0132933 A1* 6/2007 Lee ................. G02F 1/1309
349/153
2011/0281489 A1 11/2011 Tannas, Jr.
(Continued)

FOREIGN PATENT DOCUMENTS

JP    2013-532304 A    8/2013

*Primary Examiner* — Edmond C Lau
(74) *Attorney, Agent, or Firm* — Keating & Bennett, LLP

(57) ABSTRACT

A method of producing a liquid crystal panel 10 having a non-quadrangular outline includes a common liquid crystal panel producing process, a cutting process of cutting the common liquid crystal panel 50 along a cutting line L10 that is along the outline such that a part of the sealing material 54 is removed and a remaining part of the sealing material 54 remains and forming on the common liquid crystal panel 50 a sealing material removed edge portion 50A at which the part of the sealing material 54 is removed to expose the liquid crystal layer 51, a line correction process of correcting the lines 55, 56, 59 near the processed edge portion 53E of the array substrate 53, and a sealing process of providing sealing resin R on the sealing material removed edge portion 50A to close a space between the processed edge portions 52E, 53E of the substrates and seal the liquid crystal layer 51 with the remaining part of the sealing material 54.

6 Claims, 21 Drawing Sheets

(51) Int. Cl.
 *G02F 1/1341* (2006.01)
 *G02F 1/1343* (2006.01)
 *G02F 1/1335* (2006.01)

(52) U.S. Cl.
 CPC .. *G02F 1/133512* (2013.01); *G02F 1/133514* (2013.01); *G09F 9/00* (2013.01); *G02F 2201/56* (2013.01)

(56) References Cited

U.S. PATENT DOCUMENTS

| | | | |
|---|---|---|---|
| 2012/0223316 A1* | 9/2012 | Kanzaki | H01L 29/66765 257/72 |
| 2013/0075357 A1 | 3/2013 | Tannas, Jr. | |
| 2017/0017131 A1* | 1/2017 | Aoki | G02F 1/136259 |
| 2017/0351125 A1 | 12/2017 | Tannas, Jr. | |

* cited by examiner

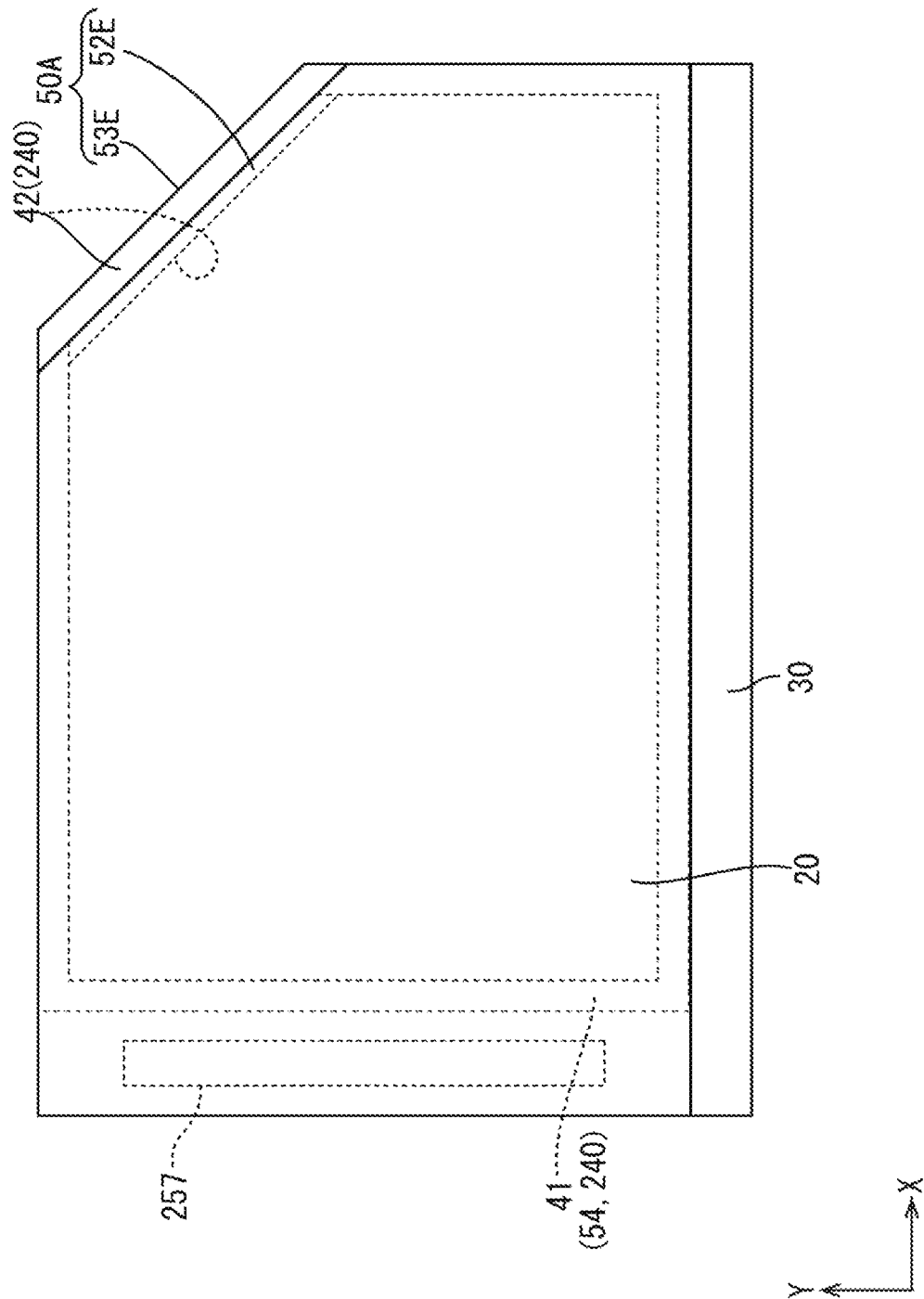

METHOD OF PRODUCING LIQUID CRYSTAL PANEL

TECHNICAL FIELD

The present technology relates to a method of producing a liquid crystal panel.

BACKGROUND ART

A display device including a liquid crystal panel as a display section displaying an image has been known. Such a display device generally includes a square liquid crystal panel and an example of a method of producing such a liquid crystal panel is described in Patent Document 1. Patent Document 1 discloses a technology of cutting a square liquid crystal panel and altering a size (a shape) of the liquid crystal panel.

RELATED ART DOCUMENT

Patent Document 1: Japanese Translation of PCT International Application Publication No. JP-T-2013-532304

Problem to be Solved by the Invention

According to the technology described in Patent Document 1, a square liquid crystal panel is cut to obtain a square liquid crystal panel having a smaller size and a liquid crystal panel having a deformed shape with a curved outline cannot be produced.

DISCLOSURE OF THE PRESENT INVENTION

The present technology was made in view of the above circumstances. An object is to produce liquid crystal panels having various types of deformed shapes effectively.

Means for Solving the Problem

A method of producing a liquid crystal panel is a method of producing a liquid crystal panel having a non-quadrangular outline, and the method includes a common liquid crystal panel producing process of producing a common liquid crystal panel at least including a line substrate having lines thereon, a liquid crystal layer, a counter substrate opposite the line substrate and having the liquid crystal layer therebetween, and sealing material that is formed in a frame shape and between the line substrate and the counter substrate and surrounds and seals the liquid crystal layer, a cutting process of cutting the common liquid crystal panel along a cutting line that is along the non-quadrangular outline such that apart of the sealing material is removed and a remaining part of the sealing material remains, and forming a sealing material removed edge portion including an edge portion of the line substrate and an edge portion of the counter substrate at which the part of the sealing material is removed to expose the liquid crystal layer, a line correction process of correcting the line near the edge portion of the line substrate, and a sealing process of providing sealing resin on the sealing material removed edge portion to close a space between the edge portion of the line substrate and the edge portion of the counter substrate and seal the liquid crystal layer with the remaining part of the sealing material.

First, the common liquid crystal panel is produced in the common liquid crystal panel producing process. In the cutting process, the common liquid crystal panel is cut along the cutting line that is along the non-quadrangular outline and a part of the sealing material is removed and a remaining part of the sealing material remains. Through the cutting process, the sealing material removed edge portion is formed on the common liquid crystal panel such that the sealing material removed edge portion includes the processed edge portions of the line substrate and the counter substrate from which the part of the sealing material is removed to expose the liquid crystal layer. Near the sealing material removed edge portion, a portion including the line is cut in the cutting process. The line formed on the line substrate includes lines that are included in different layers having an insulation layer therebetween and cross. Insulation is established between crossing points of the lines included in the different layers via the insulation layer in a general layered structure. In the cutting process, if the cutting line is on or near the crossing points, the insulation between the crossing points established by the insulation layer may be destroyed and the crossing points may be short-circuited and a display error may be caused. The line where short-circuit may be caused is corrected in the line correction process, and the display error due to the short-circuit that may be caused in the cutting process is less likely to be caused. In correcting the line, the line is irradiated with a laser beam and cut. In the sealing process, the sealing resin is supplied on the sealing material removed edge portion to seal the liquid crystal layer. Accordingly, the liquid crystal panels having various kinds of deformed shapes are effectively produced.

Following configurations may be preferable for embodiments of the present technology.

(1) In the cutting process, the common liquid crystal panel may be cut such that the edge portion of the line substrate is on an outer side than the edge portion of the counter substrate. Accordingly, in the line correction process, the line that is arranged on the edge portion of the line substrate that is on an outer side than the edge portion of the counter substrate is corrected. Namely, the line correction is performed away from the liquid crystal layer. Therefore, debris that may be generated according to the lien correction is less likely to be scattered within the liquid crystal layer.

(2) In the sealing process, the sealing resin may be disposed with coating on the edge portion of the line substrate that is on the outer side than the edge portion of the counter substrate. Accordingly, the sealing resin disposed in the sealing process is less likely to spread outside from the edge portion of the line substrate.

(3) The sealing process may be performed after the line correction process. Accordingly, compared to the method in which the processes are performed in a reversed order, the correction of the line in the line correction process is less likely to be obstructed by the sealing resin. Therefore, the line is corrected easily with high reliability.

(4) In the line correction process, a part of the line that is adjacent to the cutting line may be cut. Accordingly, after the cutting, problems such as short-circuit are less likely to be caused in the portion of the line on the line substrate near the cutting line. In the line correction process, the portion of the line near the cutting line is cut such that the remaining portion of the line is separated from the portions in which a problem such as short-circuit is caused. Therefore, the remaining portion of the line can be normally used.

(5) In the common liquid crystal panel producing process, a switching component connected to the line, a pixel electrode connected to the switching component, a common electrode disposed over the pixel electrode may be at least formed on the line substrate. In the common liquid crystal panel produced in the common liquid crystal panel producing process, the pixel electrode connected to the switching component and the common electrode disposed over the pixel electrode are at least formed on the line substrate and the common electrode is not formed on the counter substrate. If the pixel electrode is formed on the line substrate and the common electrode is formed on the counter substrate, a following problem may be caused. If roughness is caused on a cut surface of the processed edge portion of the line substrate according to the cutting performed in the cutting process, the pixel electrode and the line on the array substrate and the common electrode on the counter substrate may be short-circuited. On the other hand, in the configuration including the pixel electrode and the common electrode collectively on the line substrate, even if roughness is caused on a cut surface of the processed edge portion of the line substrate according to the cutting performed in the cutting process, the above-described short-circuit is less likely to be caused.

(6) In the common liquid crystal panel producing process, monolithic gate drivers may be arranged dispersedly on an inner side with respect to the sealing material on the line substrate. With the liquid crystal panel having such a line substrate, the liquid crystal panel having a non-quadrangular outline is produced easily.

Advantageous Effect of the Invention

According to the technology described herein, liquid crystal panels having various types of deformed shapes are effectively produced.

BRIEF DESCRIPTION OF THE DRAWINGS

FIG. 21 is a plan view of a liquid crystal panel obtained by sealing a sealing material removed edge portion of the common liquid crystal panel with sealing resin.

MODES FOR CARRYING OUT THE INVENTION

First Embodiment

Figure 1:
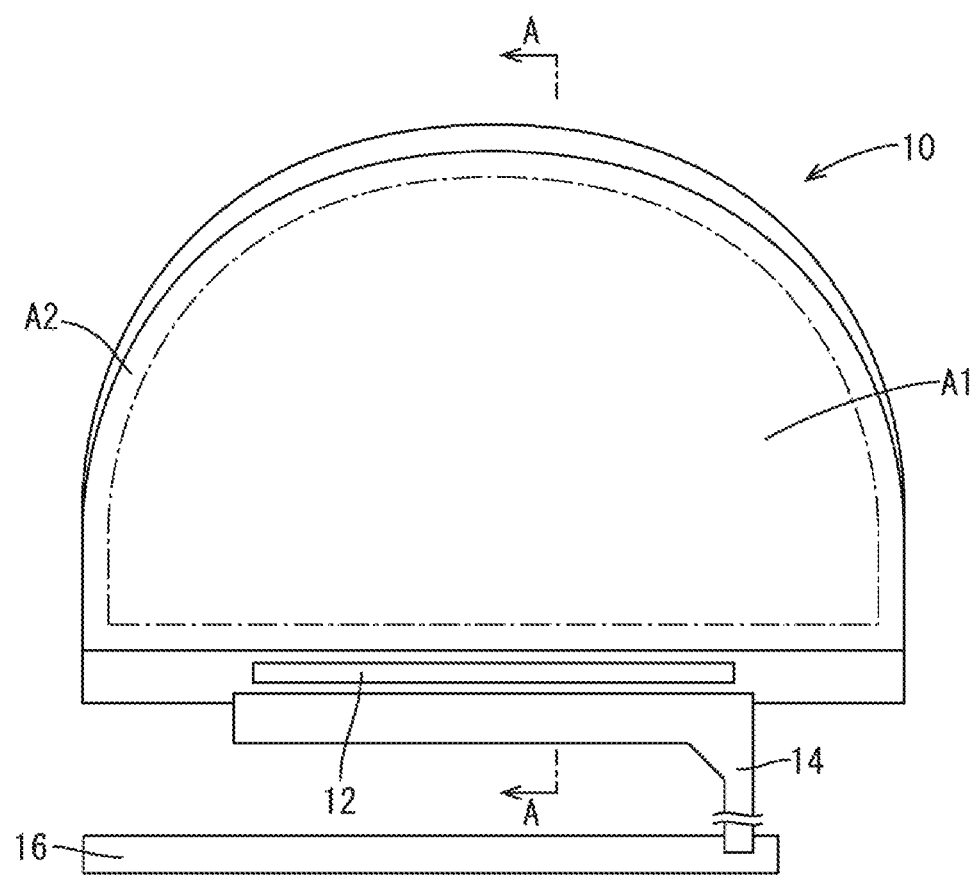
FIG. 1 is a schematic plan view illustrating a liquid crystal panel according to a first embodiment of the present technology.

A first embodiment will be described with reference to FIGS. 1 to 15. In this embodiment section, a method of producing a liquid crystal panel 10 included in a liquid crystal display device and having a non-quadrangular shape (deformed shape) will be described. X-axis, Y-axis and Z-axis may be indicated in the drawings and the axes in each drawing correspond to the respective axes in other drawings. Front and rear sides of the liquid crystal panel 10 are defined with reference to FIG. 2. An upper side in FIG. 2 corresponds to a front side of the liquid crystal panel 10 and a lower side in FIG. 2 corresponds to a rear side (a back surface side) of the liquid crystal panel 10. Upper and lower sides of a display section A1 of the liquid crystal panel 10 are defined with reference to FIG. 1 and an upper side in FIG. 1 corresponds to an upper side of the display section A1 of the liquid crystal panel 10 and a lower side in FIG. 1 corresponds to a lower side of the display section A1.

A configuration of the liquid crystal panel 10 will be described. The liquid crystal panel 10 of this embodiment does not have a general quadrangular outline plan view shape (such as a rectangular shape or a square shape) but has an outline shape a part of which is curved such as an arched shape. The liquid crystal panel 10 has a deformed shape (a non-quadrangular shape) as a whole. Specifically, the liquid crystal panel 10 has a substantially upper half section having an outline of substantially an arched plan view shape and has a substantially lower half section having an outline of a part of rectangular plan view shape. Such a liquid crystal panel 10 has a semicircular shape as a whole. In this specification, for easy description, the upper side of the liquid crystal panel 10 may be referred to as a semicircular side and the lower side thereof may be referred to as a rectangular side. An outline forming an outer shape of the liquid crystal panel 10 includes a linear part extending linearly along a right-left direction in FIG. 1 and the linear part of the outline matches the X-axis direction.

As illustrated in FIG. 1, the liquid crystal panel 10 includes a display section A1 having a curved outline extending along an outline of the liquid crystal panel 10. The display section A1 is a section of a front side surface of the liquid crystal panel 10 and images appear on the display section A1 and a most area of the front side surface is the display section A1. An area outside the display section A1 is a non-display section A2 of a frame portion surrounding the display section A1. No images are displayed on the non-display section A2 and the non-display section A2 has a non-quadrangular frame shape as a whole.

The non-display section A2 includes a mounting area A3 in which an IC chip (an example of a driving component) 12 and a flexible printed circuit board 14 are mounted. The mounting area A3 is locally close to one edge portion of the liquid crystal panel 10 with respect to the Y-axis direction (on a rectangular side or a lower side in FIG. 1). The IC chip 12 is an electronic component (a driver) that drives the liquid crystal panel 10 and a control board 16 that supplies various input signals from the outside to the IC chip 12 is connected to the liquid crystal panel 10 via the flexible printed circuit board 14. As illustrated in FIG. 1, the mounting area A3 is a laterally elongated rectangular area and included in apart of an edge portion of an array substrate, which will be described later. In FIG. 1, a long-side direction of the mounting area A3 matches the X-axis direction and a short-side direction thereof matches the Y-axis direction.

Figure 2:
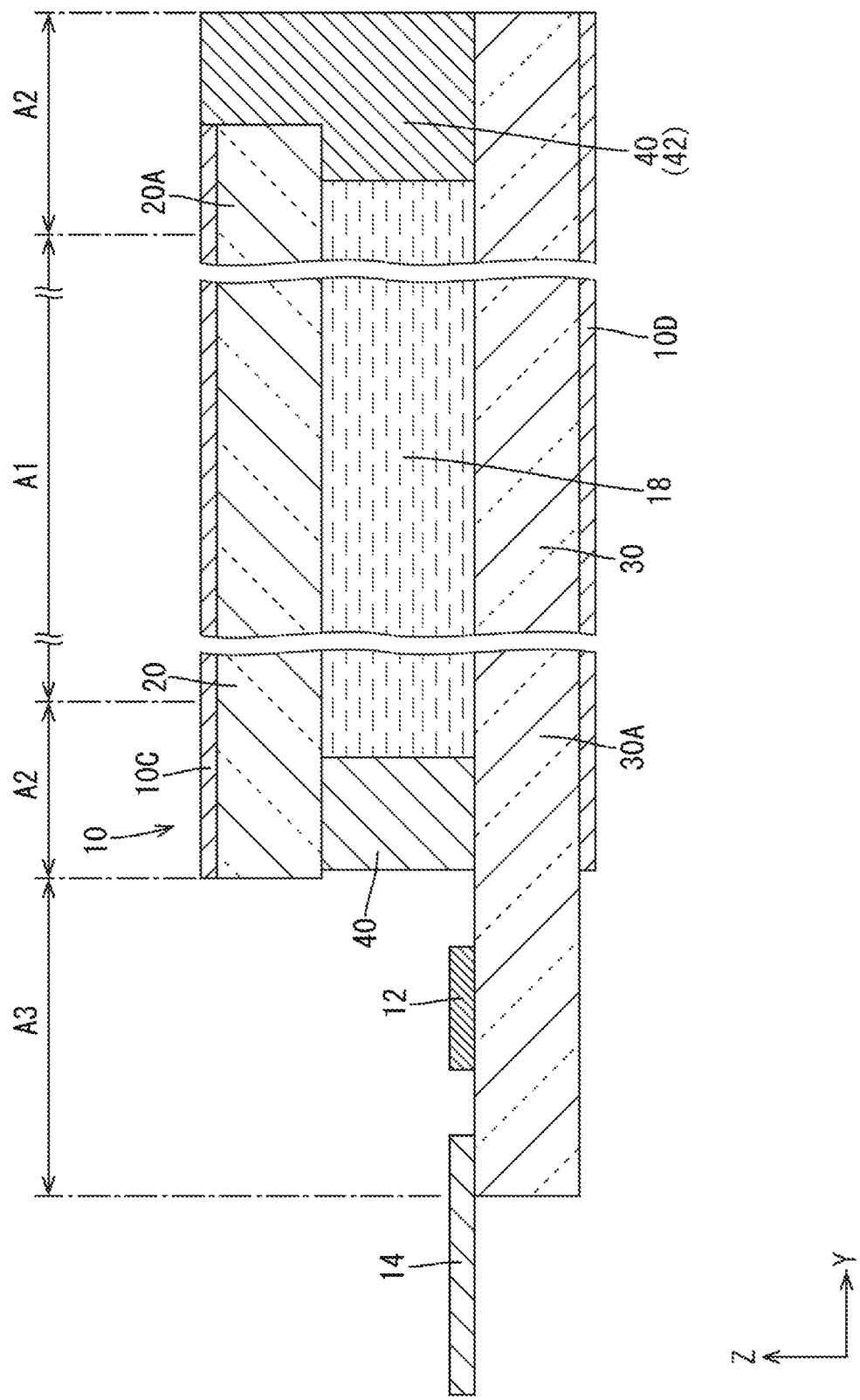
FIG. 2 is a cross-sectional view taken along line A-A in FIG. 1.

As illustrated in FIG. 2, the liquid crystal panel 10 includes a pair of substrates 20 and 30 having high transmissivity and a liquid crystal layer 18 including liquid crystal molecules. The substrates 20 and 30 include a CF substrate (a counter substrate) 20 on the front and an array substrate (a line substrate) 30 on a back side. The array substrate 30 includes an edge portion that corresponds to the rectangular side of the liquid crystal panel 10 and the edge portion projects outside from an edge of the CF substrate 20 and forms the mounting area A3. The edge portion of the array substrate 30 includes terminals (which will be illustrated later) that are electrically connected to the IC chip 12 and the flexible printed circuit board 14. The liquid crystal layer 18 is sandwiched between the substrates 20, 30. The liquid crystal molecules included in the liquid crystal layer 18 have optical characteristics that vary according to application of electric field. Alignment films 10A and 10B are formed on inner surfaces of the substrates 20 and 30, respectively, for aligning the liquid crystal molecules included in the liquid crystal layer 18. Polarizing plates 10C and 10D are bonded to outer surfaces of the substrates 20, 30, respectively.

Figure 3:
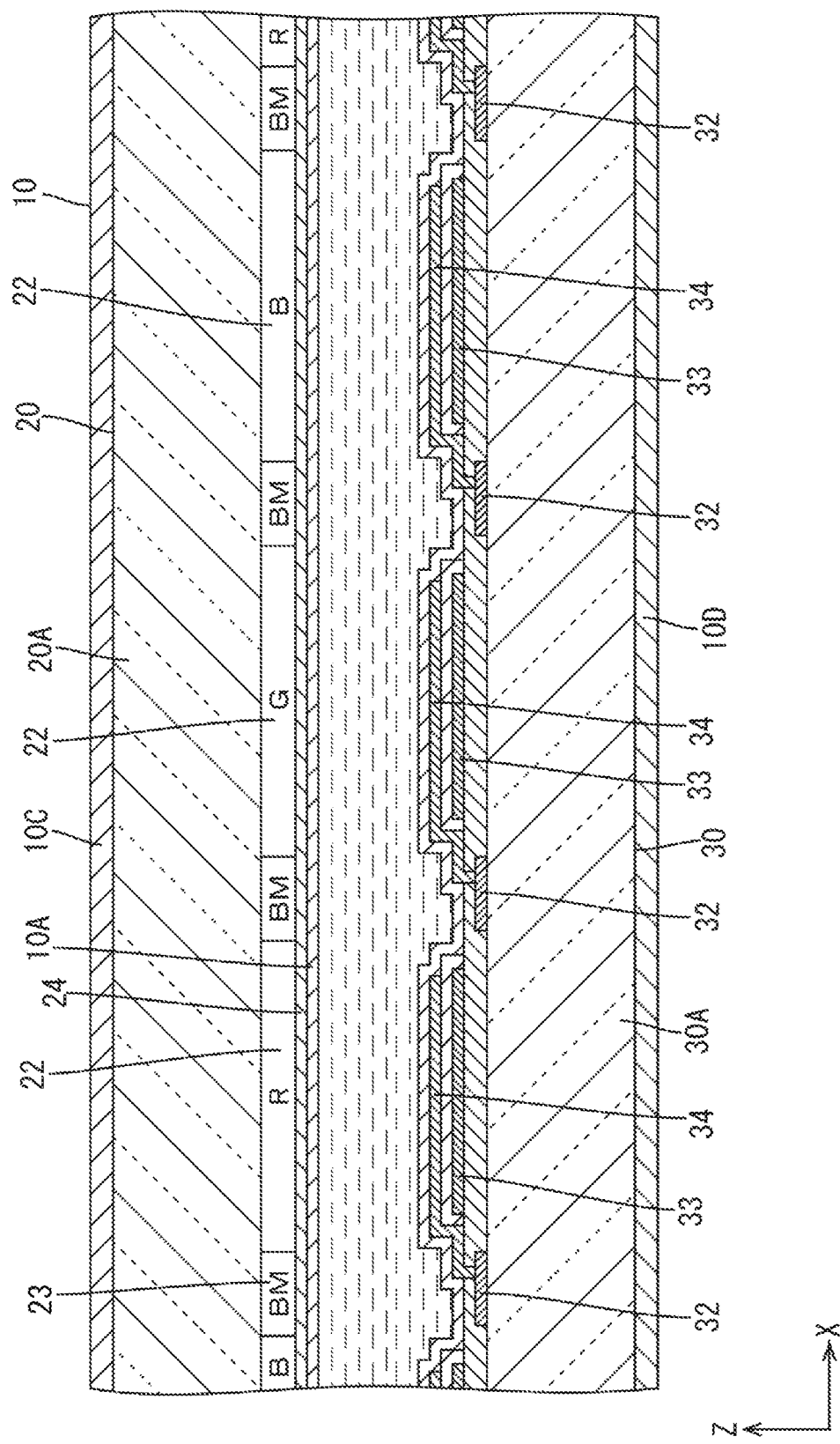
FIG. 3 is a cross-sectional view illustrating a pixel configuration of a display section of the liquid crystal panel.
Figure 4:
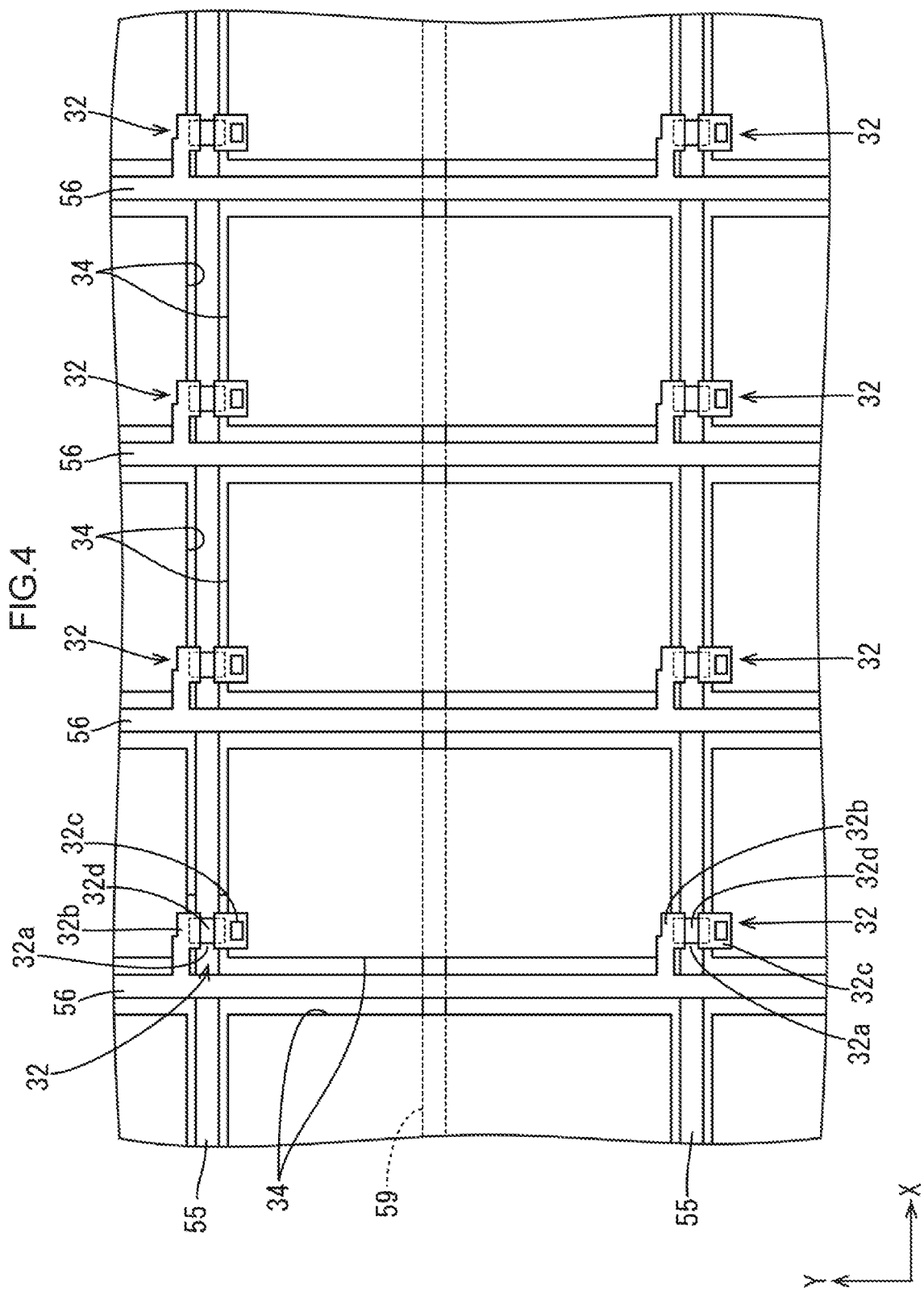
FIG. 4 is a plan view illustrating pixel arrangement in the display section of an array substrate included in the liquid crystal panel.

As illustrated in FIGS. 3 and 4, the array substrate 30 includes thin film transistors (TFTs) 32 that are switching components and pixel electrodes 34 that are connected to the TFTs 32, and the TFTs 32 and the pixel electrodes 34 are arranged in a matrix on the inner surface (a liquid crystal layer 18 side) of the a glass support substrate 30A. Lines such as gate lines (lines) 55, source lines (lines) 56, and capacitance lines (lines) 59 are arranged on the array substrate 30. The gate lines 55 and the source lines 56 included in the lines are arranged perpendicular to each other and are arranged in a grid as a whole to define each of the TFTs 32 and the pixel electrodes 34 that are adjacent to each other. The gate lines 55 are connected to gate electrodes 32a of the TFTs 32 and the source lines 56 are connected to source electrodes 32b of the TFTs 32. The capacitance line 59 extends in an extending direction of the gate lines 55 and is present between the adjacent gate lines 55. The capacitance line 59 crosses and overlaps the pixel electrode 34 and generates an electrostatic capacitance between the capacitance line 59 and the pixel electrode 34. The extending direction in which the gate lines 55 and the capacitance lines 59 extend matches the X-axis direction and the extending direction in which the source lines 56 extend matches the Y-axis direction. The TFT 32 includes a drain electrode 32c that is opposite the source electrode 32b having a channel section 32d therebetween. The pixel electrode 34 is connected to the drain electrode 32c. The channel section 32d is formed from a semiconductor film and the semiconductor film is preferably formed from an oxide semiconductor.

As illustrated in FIGS. 3 and 4, the array substrate 30 includes common electrodes 33 overlapping the respective pixel electrodes 34 having a insulation layer therebetween. A common potential (a reference potential) is supplied to the common electrode 33 such that an electric field is produced between the pixel electrode 34 and the common electrode 33. A driving type of the liquid crystal panel 10 according to this embodiment is a fringe filed switching (FFS) type that is a mode improved from an in-plane switching (IPS) mode. The pixel electrodes 34 and the common electrodes 33 are formed on the array substrate 30 side and the pixel electrodes 34 and the common electrodes 33 are included in different layers. The pixel electrode 34 includes slits (not illustrated) extending in an oblique direction with respect to the X-axis direction and the Y-axis direction in a plan view. The slits are arranged at intervals. Predetermined potential difference is generated between the pixel electrode 34 and the common electrode 33, which are included in different layers, because of the slits. When potential difference appears between the pixel electrode 34 and the common electrode 33, a fringe field (an oblique field) including a component in a direction normal to a plate surface of the array substrate 30 is applied to the liquid crystal layer in addition to a component in a direction along the plate surface of the array substrate 30. The alignment state of the liquid crystal molecules included in the liquid crystal layer 18 can be switched as appropriate with using the fringe field. The pixel electrodes 34 and the common electrodes 33 are formed from a transparent electrode film such as indium tin oxide (ITO) and zinc oxide (ZnO). Monolithic gate drivers 57 are dispersedly arranged within the display section A1 on the support substrate 30A (see FIG. 6). The alignment film 10B is formed on an inner surface of the support substrate 30A to cover the TFTs 32 and the pixel electrodes 34. The array substrate 30 includes terminals 58 of the lines 55, 56, 59 on the rectangular side edge portion thereof.

As illustrated in FIG. 3, the CF substrate 20 includes color filters 22 that are arranged on the inner surface side (the liquid crystal layer 18 side) of a glass support substrate 20A. The color filters 22 include color filters of red (R), green (G), and blue (B) that are arranged in a matrix. A light blocking layer (a black matrix) 23 is formed on the support substrate 20A to define each of the color filters 22. An overcoat film (a flattening film) 24 is formed to cover the color filters 22 and the light blocking layer 23. The alignment film 10A is formed on the inner surface side of the support substrate 20A to cover the overcoat film 24. Accordingly, the CF substrate 20 includes no lines such as the gate lines 55, the source lines 56, and the capacitance lines 59 and the lines are collectively included on the array substrate 30.

As illustrated in FIGS. 1 and 2, the CF substrate 20 and the array substrate 30 are bonded with each other with sealing material 40 such that arched outlines thereof are aligned with each other and the rectangular side edge portion of the array substrate 30 is arranged outside the rectangular side edge of the CF substrate 20. The sealing material 40 is disposed in a substantially semicircular frame shape as a whole so as to surround the liquid crystal layer 18 in a plan view along the outline shape of the CF substrate 20. The display section A1 is inside the sealing material 40. As will be described later, the sealing material 40 includes basic sealing material 41 and supplemental sealing material 42 (see FIG. 2). The basic sealing material 41 is used for a quadrangular liquid crystal panel (a common liquid crystal panel 50) from which the liquid crystal panel 10 is produced. The supplemental sealing material 42 is additionally provided on sections of the panel from which the basic sealing material 41 is removed in the process of producing the liquid crystal panels 10. Sealing material that is used for a conventional general quadrangular liquid crystal panel is used as the basic sealing material 41. For example, the known sealing material of ultraviolet curable resin, thermosetting resin, ultraviolet curable and thermosetting resin is used. Details of the supplemental sealing material 42 will be described later. A substrate opposite the array substrate 30 is the CF substrate 20. However, in a configuration of a liquid crystal panel including a color filter on the array substrate side, a substrate opposite the array substrate 30 may be a transparent counter substrate without including a color filter and a light blocking layer or a counter substrate including a light blocking layer and without including a color filter.

The liquid crystal panel 10 having such a configuration and a non-quadrangular shape is produced by cutting a quadrangular common liquid crystal panel 50 into a certain shape with a deformation scribing device (hereinafter, referred to as a deformation cutting). Hereinafter, a method of producing the liquid crystal panel 10 using the common liquid crystal panel 50 will be described.

Figure 5:
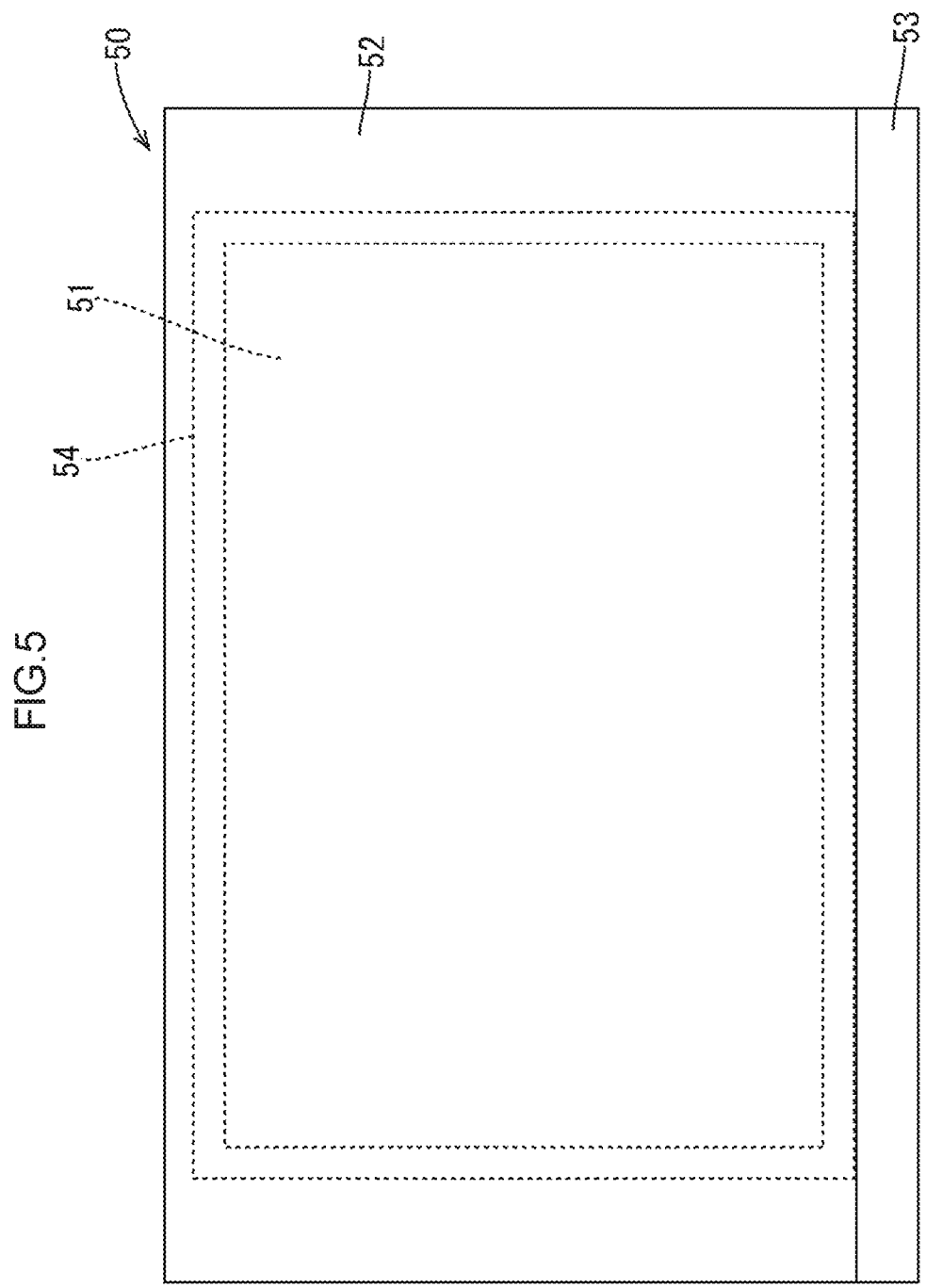
FIG. 5 is a plan view illustrating a common liquid crystal panel.

The common liquid crystal panel 50 will be described. The common liquid crystal panel 50 is a member (a liquid crystal panel) commonly used for producing liquid crystal panels having various kinds of deformed shapes. In this embodiment, the common liquid crystal panel 50 is used for producing the above-described liquid crystal panels 10 having a semicircular shape. Specifically, as illustrated in FIG. 5, the common liquid crystal panel 50 of this embodiment has a laterally elongated rectangular plan view shape and has a configuration similar to that of the liquid crystal panel 10. Namely, the common liquid crystal panel 50 has a configuration similar to that of the conventional quadrangular liquid crystal panel. The common liquid crystal panel 50 mainly includes a liquid crystal layer 51, a rectangular CF substrate 52, a rectangular array substrate 53, and sealing material 54 that surrounds the liquid crystal layer 51 and with which the CF substrate 52 and the array substrate 53 are bonded.

Figure 6:
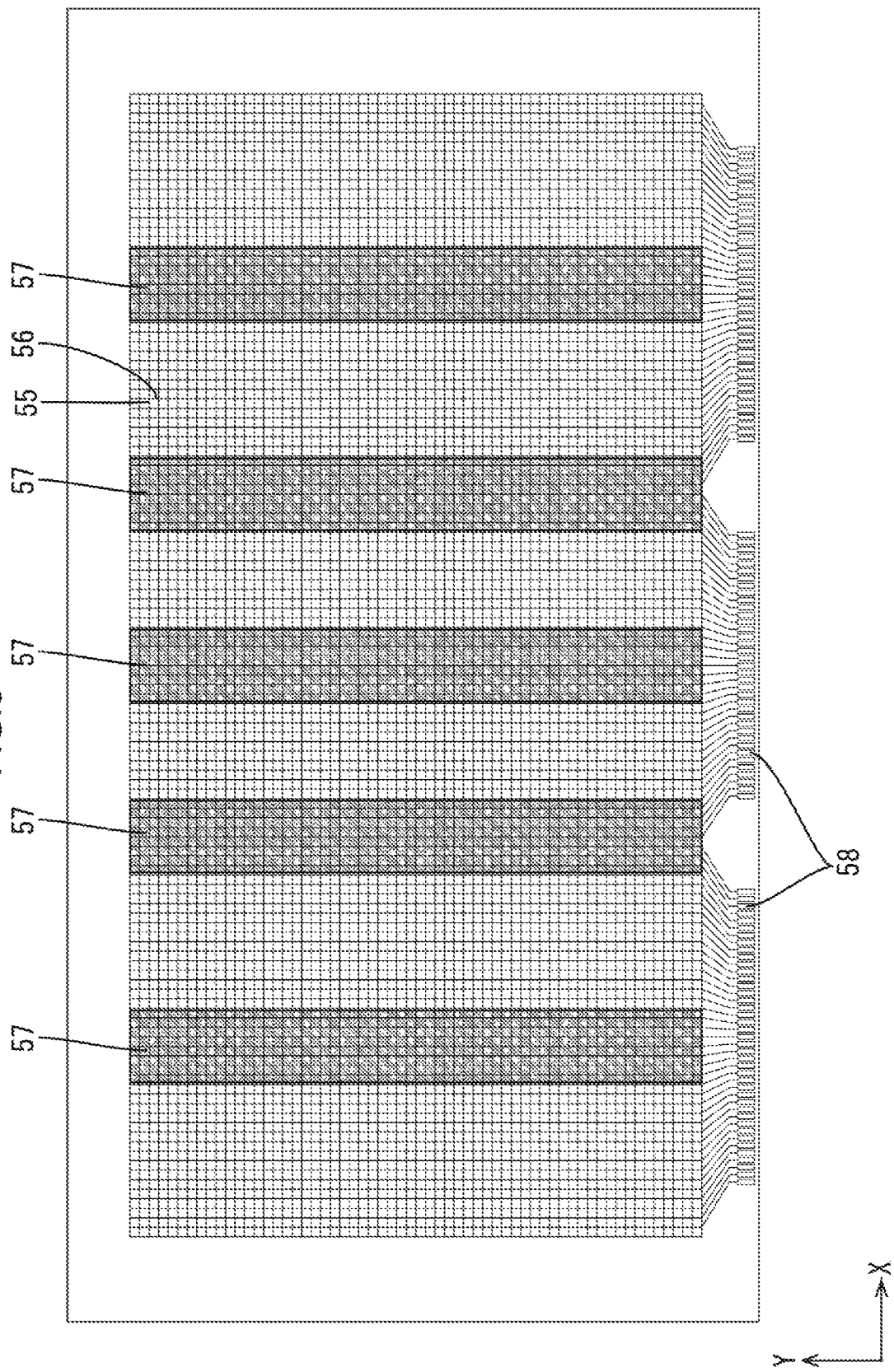
FIG. 6 is a plan view illustrating the array substrate included in the common liquid crystal panel seen from an inner surface side.

As illustrated in FIG. 6, the array substrate 53 includes a rectangular support substrate 53A, lines such as gate lines 55, source lines 56, and capacitance lines 59 disposed on the support substrate 53A, and monolithic gate drivers 57. The gate drivers 57 extend in a short-side direction of the common liquid crystal panel 50 and are arranged within belt-like areas at an interval in a long-side direction of the common liquid crystal panel 50. The gate drivers 57 are arranged in the respective belt-like areas dispersedly. The support substrate 53A has a long-side edge portion that is the mounting area A3 of the liquid crystal panel 10. Terminals 58 of the lines 44, 46, 49 are formed on the long-side edge portion. The array substrate 53 is bonded to the CF substrate 52 with the sealing material 54 such that the long-side edge portion having the terminals 58 thereon is outside the CF substrate 52. A part of the sealing material 54 will be finally basic sealing material 41 of the liquid crystal panel 10.

(Common Liquid Crystal Panel Producing Process)

Next, a process of producing the common liquid crystal panel 50 will be described. The common liquid crystal panels 50 are produced such that a mother panel integrally includes common liquid crystal panels in a matrix similarly to the conventional quadrangular liquid crystal panels (a mother common liquid crystal panel producing process). A member integrally including the common liquid crystal panels 50 is cut and divided into pieces and multiple common liquid crystal panels 50 are obtained (a dividing process). In this specification, the member integrally including the common liquid crystal panels 50 in a matrix is referred to as a mother common liquid crystal panel 60. Hereinafter, a process of producing the common liquid crystal panels 50 will be described with reference to FIGS. 7 to 10.

(Mother CF Substrate Producing Process)

Figure 7:
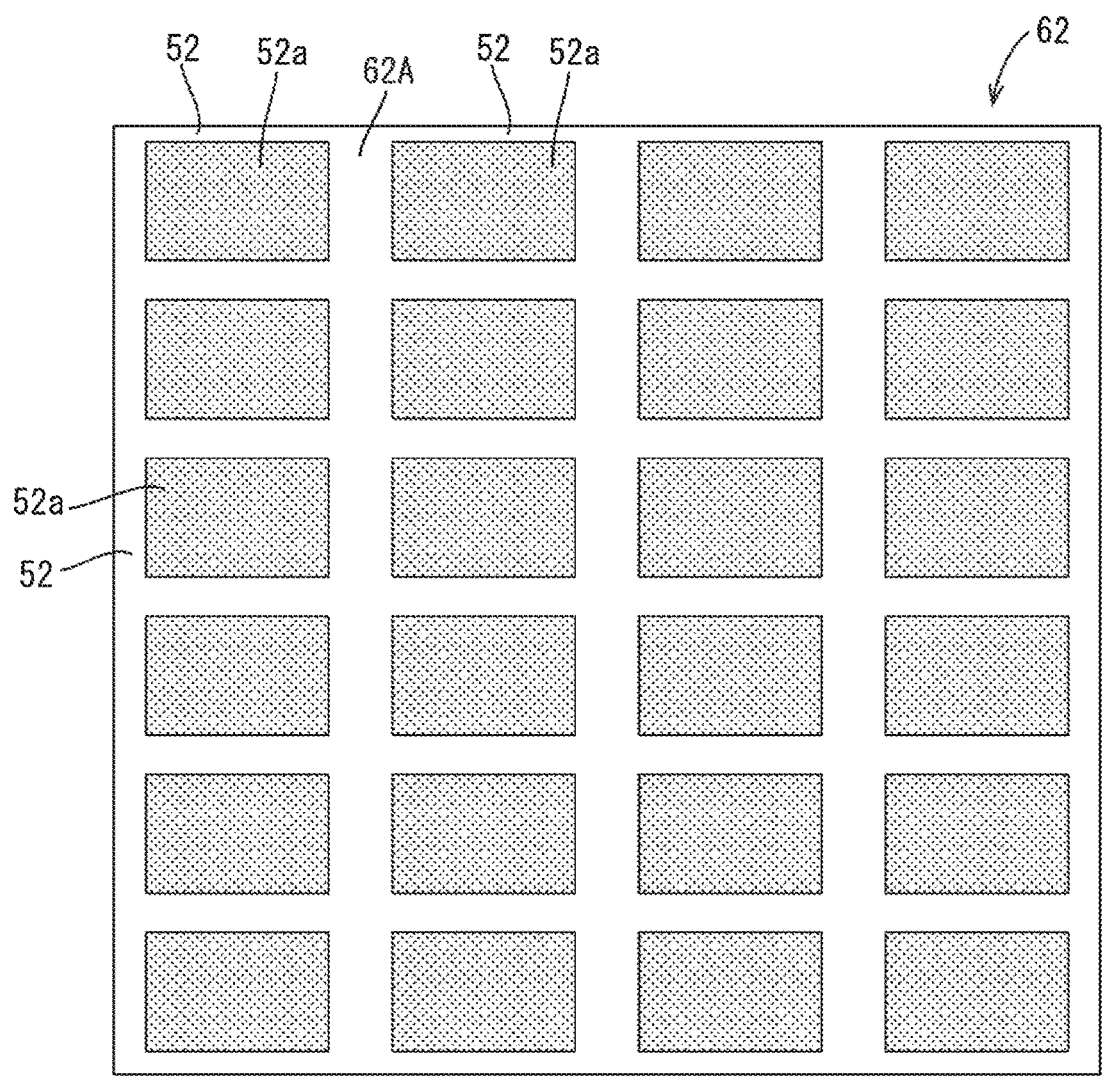
FIG. 7 is a plan view of a mother CF substrate.

As illustrated in FIG. 7, a mother CF substrate 62 integrally includes CF substrates 52 in a matrix. The mother CF substrate 62 includes color filter layered members 52a in a matrix on a glass mother support substrate 62A. Each of the color filter layered members 52a is a layered member including a color filter 22, a light blocking layer 23, and an overcoat film 24 disposed on the support substrate 52A (20A) of the CF substrate 52 (20). The color filter layered members 52a are formed with the known technology such as a photolithography method as appropriate.

(Mother Array Substrate Producing Process)

A mother array substrate 63 integrally includes array substrates 53 in a matrix. The mother array substrate 63 includes array layered members in a matrix on a glass mother support substrate. Each of the array layered members is a layered member including a TFT 32, a pixel electrode 34, lines (such as the gate lines 55, the source lines 56, and the capacitance lines 59), and the gate driver 57. The array layered members are formed with the known technology such as the photolithography method as appropriate similar to the color filter layered members 52a.

(Alignment Film Forming Process)

Alignment films made of polyimide are formed to cover the color filter layered members 52a of the mother CF substrate 62 and the array layered members of the mother array substrate 63, respectively. Each of the alignment films is subjected to an alignment treatment such as rubbing or light irradiation. The alignment film formed on the color filter layered members 52a will be finally an alignment film 10A of the CF substrate 20 of the liquid crystal panel 10. The alignment film formed on the array layered members will be finally an alignment film 10B of the array substrate 30 of the liquid crystal panel 10.

(Sealing Material Drawing Process)

Figure 8:
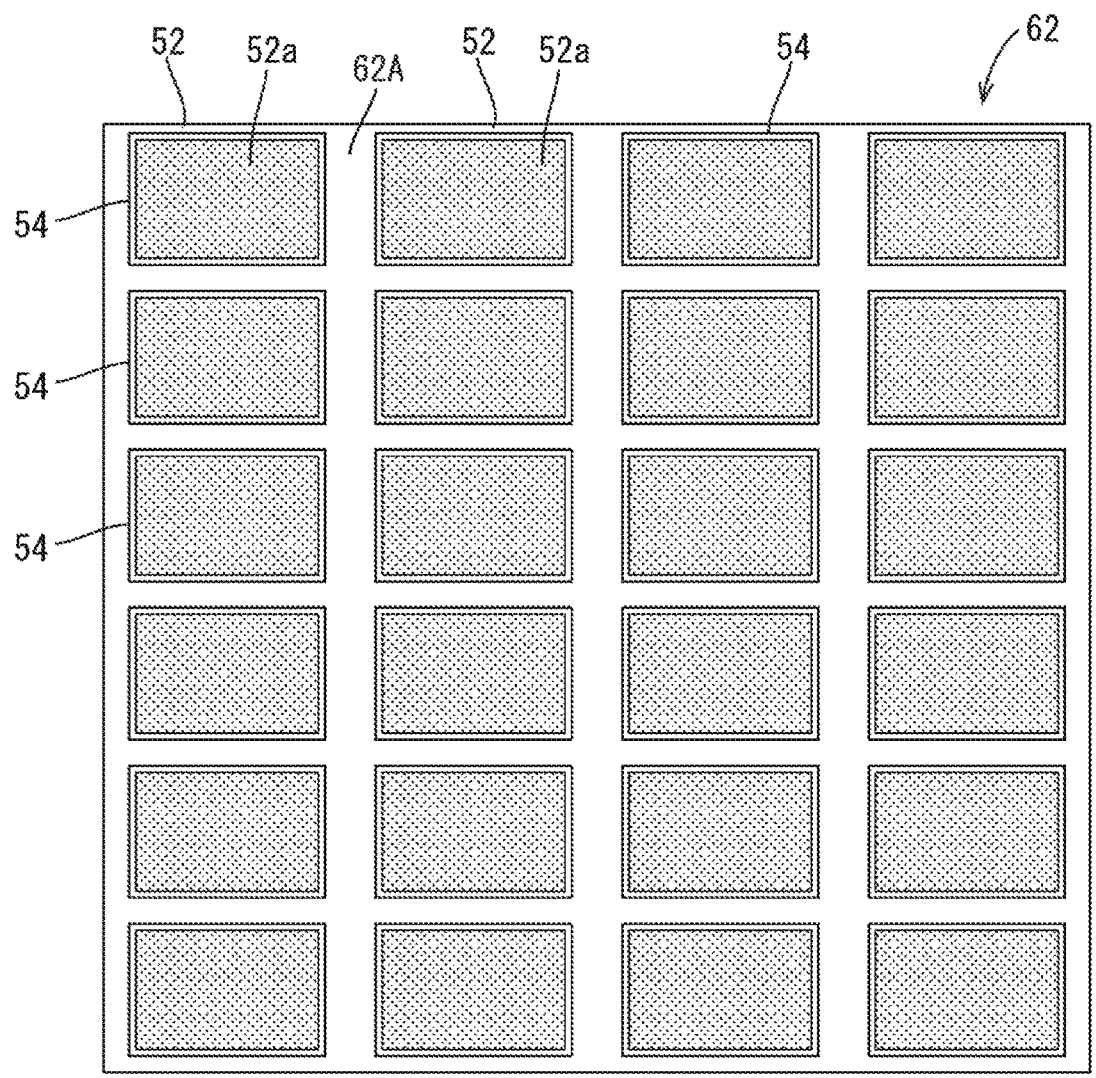
FIG. 8 is a view illustrating the mother CF substrate having sealing material for the respective CF substrates.

As illustrated in FIG. 8, the sealing material 54 is formed in a quadrangular frame plan view shape and is disposed on the mother support substrate 62A while surrounding each of the color filter layered members 52a. The sealing material 54 is provided by a certain drawing device. The sealing material 54 disposed on the mother CF substrate 62 is a photosetting and thermosetting type and is not cured in this state.

(Liquid Crystals Dropping Process)

Figure 9:
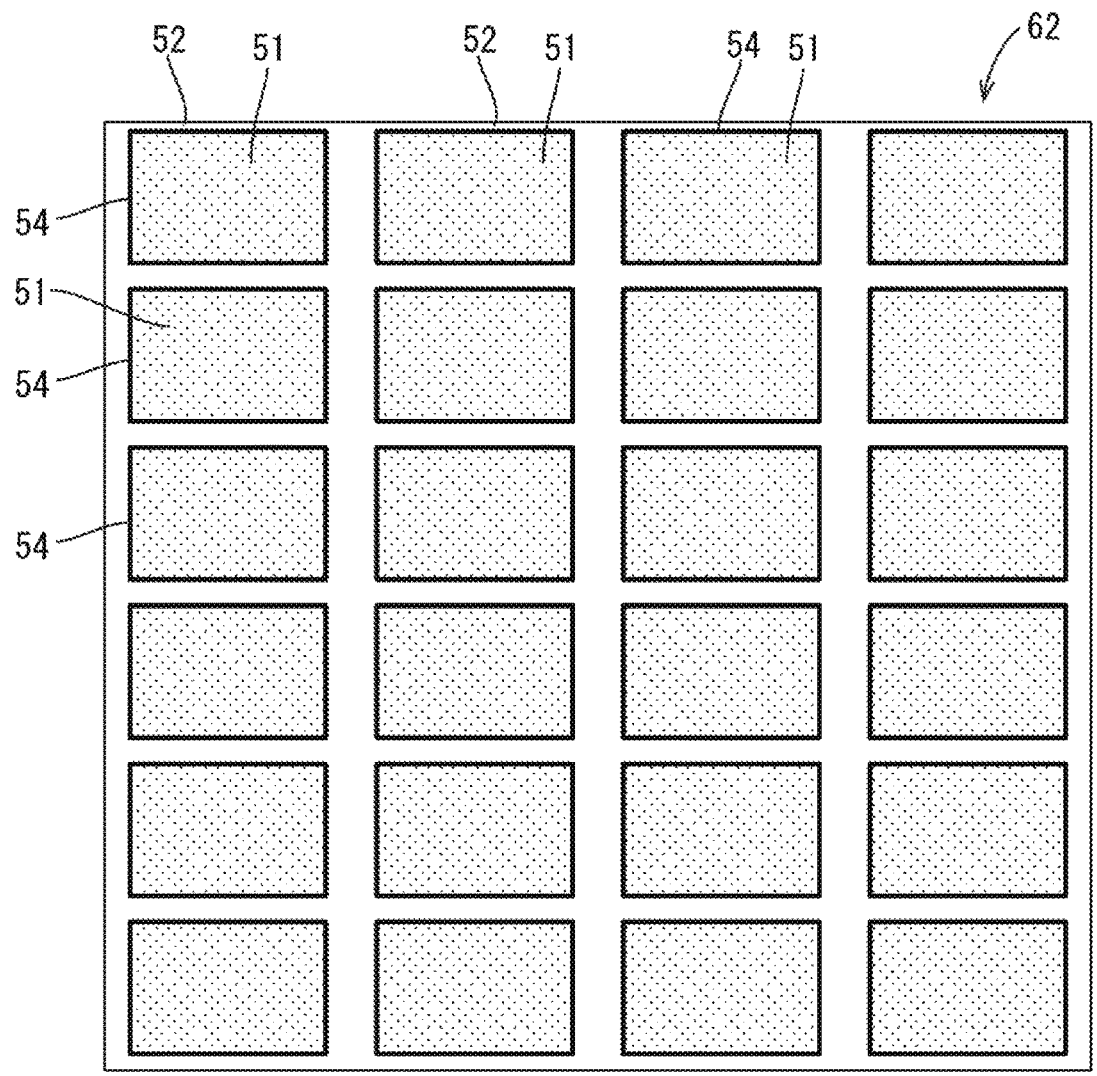
FIG. 9 is a view illustrating that a liquid crystal layer is formed for each CF substrate by dropping liquid crystals inside each of the sealing material.

As illustrated in FIG. 9, liquid crystals for the liquid crystal layer 51 are supplied to a section within the frame-shaped sealing material 54 that is disposed on the mother CF substrate 62 (the mother support substrate 62A) with the one drop fill (ODF) method using a certain liquid crystal dropping device.

(Bonding of Mother CF Substrate and Mother Array Substrate)

Figure 10:
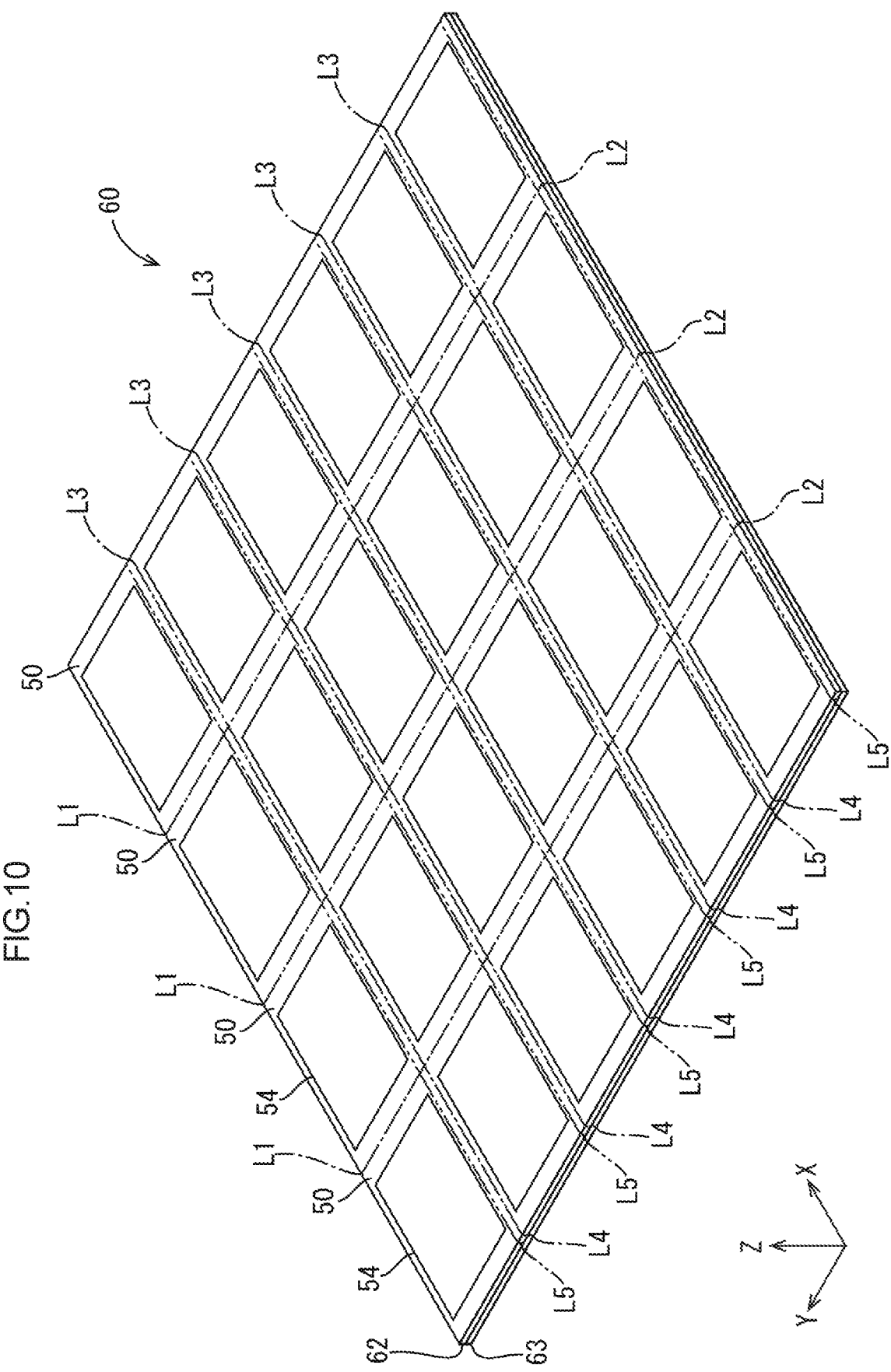
FIG. 10 is a perspective view of a mother common liquid crystal panel.

As illustrated in FIG. 9, after the liquid crystal layers 51 are formed on the mother CF substrate 62, the mother CF substrate 62 and the mother array substrate 63 are bonded to each other with the sealing material 54 with a certain bonding device. In the bonding operation, ultraviolet rays and heat are supplied to the sealing material 54 through the mother CF substrate 62 or the mother array substrate 63. Accordingly, the sealing material 54 is cured and the mother CF substrate 62 and the mother array substrate 63 are fixed to each other via the sealing material 54. Thus, the mother CF substrate 62 and the mother array substrate 63 are bonded to each other so that the mother common liquid crystal panel 60 is obtained as illustrated in FIG. 10. The mother common liquid crystal panel producing process includes the processes from the producing process of producing the mother CF substrate 62 and the mother array substrate 63 to the bonding process of bonding the mother CF substrate 62 and the mother array substrate 63.

(Common Liquid Crystal Panel Dividing Process)

The mother common liquid crystal panel 60 obtained as described above is cut into the common liquid crystal panels 50 (a dividing process). Scribing lines L1-L4 are illustrated in FIG. 10 as imaginary lines and the mother common liquid crystal panel 60 is cut into the common liquid crystal panels 50 along the scribing lines L1-L4. The scribing lines L1-L4 are provided on the mother CF substrate 62 and the mother array substrate 63 for defining each common liquid crystal panel 50.

The scribing lines L1 are provided along the short-side direction of the common liquid crystal panel 50 (the Y-axis direction) and the mother CF substrate 62 is cut along the short-side direction. The scribing lines L2 are provided along the short-side direction (the Y-axis direction) of the common liquid crystal panel 50 and the mother array substrate 63 is cut along the short-side direction. The scribing lines L3 are provided along a long-side direction of the common liquid crystal panel 50 (the X-axis direction) and the mother CF substrate 62 is cut along the long-side direction. The scribing lines L4 are provided along a long-side direction of the common liquid crystal panel 50 (the X-axis direction) and the mother array substrate 63 is cut along the long-side direction. The scribing lines L1 are perpendicular to the scribing lines L3 on the mother CF substrate 62. The scribing lines L2 are perpendicular to the scribing lines L4 on the mother array substrate 63.

The mother common liquid crystal panel 60 is cut along the scribing lines L1-L4 with a certain scribing device (for example, a scribing device including a wheel rotating blade) into common liquid crystal panels 50. Scribing lines L5 are provided on the mother CF substrate 62 of the mother common liquid crystal panel 60 to be used for exposing the edge portion of the array substrate 53 having the terminals 58. After the common liquid crystal panels 50 are separated from each other, the edge portion of the CF substrate 52 of each common liquid crystal panel 50 is cut along the scribing line L5. Then, the common liquid crystal panel 50 having the edge portion of the array substrate 53 being uncovered is obtained as illustrated in FIG. 5. Thus, the common liquid crystal panels 50 are produced from the mother common liquid crystal panel 60. Next, the process of producing the above-described semicircular liquid crystal panel 10 by cutting the common liquid crystal panel 50 into a deformed shape will be described.

(Common Liquid Crystal Panel Deformation Cutting Process (Cutting Process))

The liquid crystal panel 10 is shaped into a deformed shape by removing extra parts from the quadrangular common liquid crystal panel 50 by cutting with the deformation scribing device. Cutting with the deformation scribing device may be cutting with a scribing wheel, cutting with a laser, and so on. A scribing wheel may be made of cemented carbide material, a diamond sintered body, and so on. The scribing wheel has a hole at a center thereof and a pin is inserted in the hole such that the scribing wheel is rotated. In the method with the scribing wheel, the scribing wheel is moved parallel to the substrate surface of the glass support substrate of the common liquid crystal panel 50 while being pressed toward the support substrate such that the support substrate is scribed into a desired shape (a scribing process). Cracks may be generated with respect to a vertical direction to a plane surface of the support substrate due to the scribing. After the scribing process, the support substrate is broken and separated at the scribing lines, which is a break process. Deep cracks are generated in the vertical direction with respect to the plane surface of the support substrate with a high penetration scribing wheel and therefore, in scribing with a high penetration scribing wheel, the break process may be unnecessary.

Next, a scribing method with a laser beam will be described. In scribing with a laser beam, after a crack is formed with a wheel for starting laser scribing, a certain cutting line is supplied with a laser beam and heated and then, the substrate is cooled down quickly with liquid such as pure water. The glass support substrate of the common liquid crystal panel 50 is expanded at a surface thereof due to heating and compression stress is generated. Right after the generation of the compression stress, the support substrate is cooled down quickly to shrink the surface of the support substrate to generate tension stress. Such tension stress generates initial cracks and the scribing lines are formed at the positions provided with the laser beam.

Figure 11:
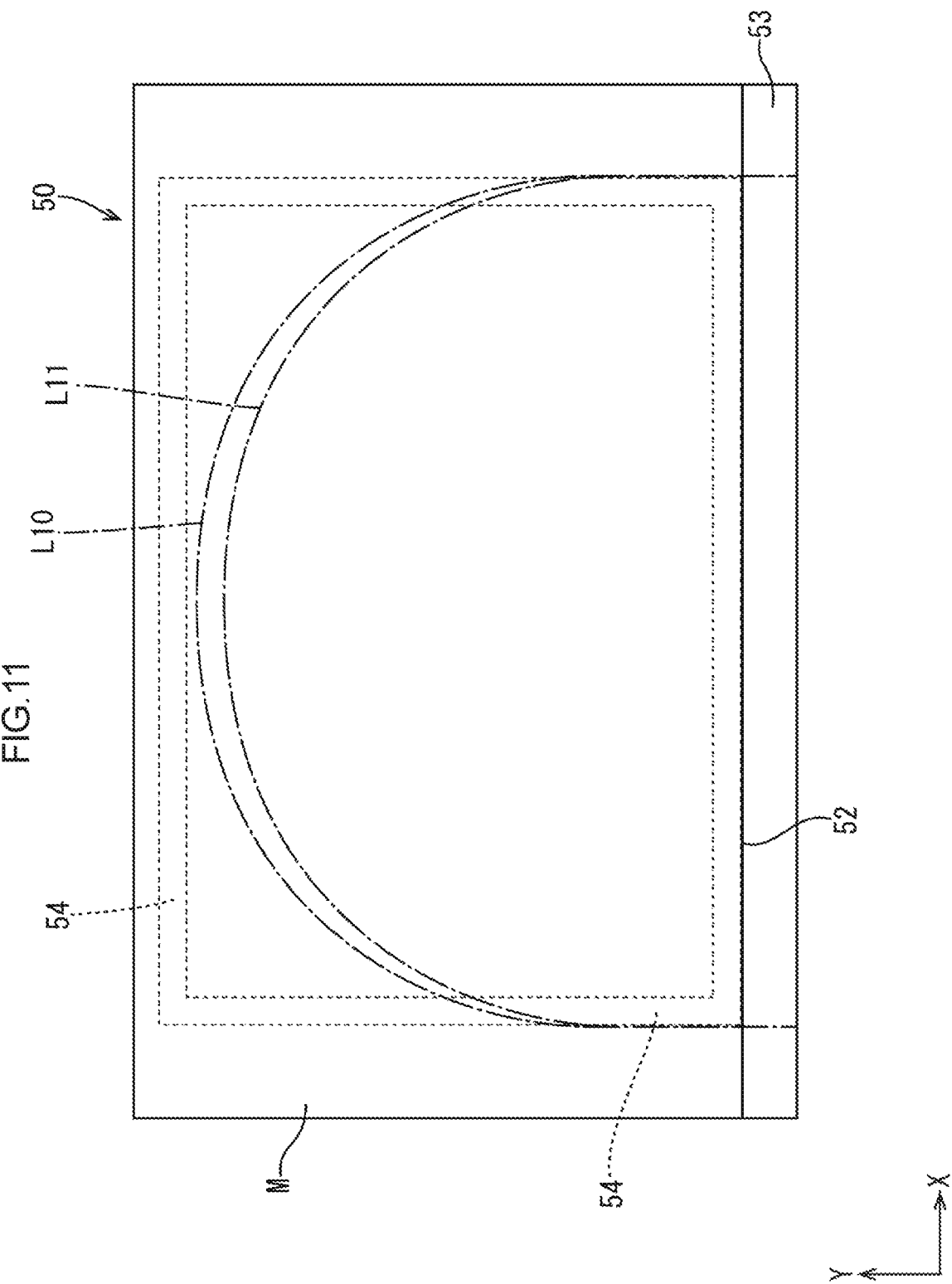
FIG. 11 is a plan view of a common liquid crystal panel having scribing lines along an outline of the liquid crystal panel.
Figure 12:
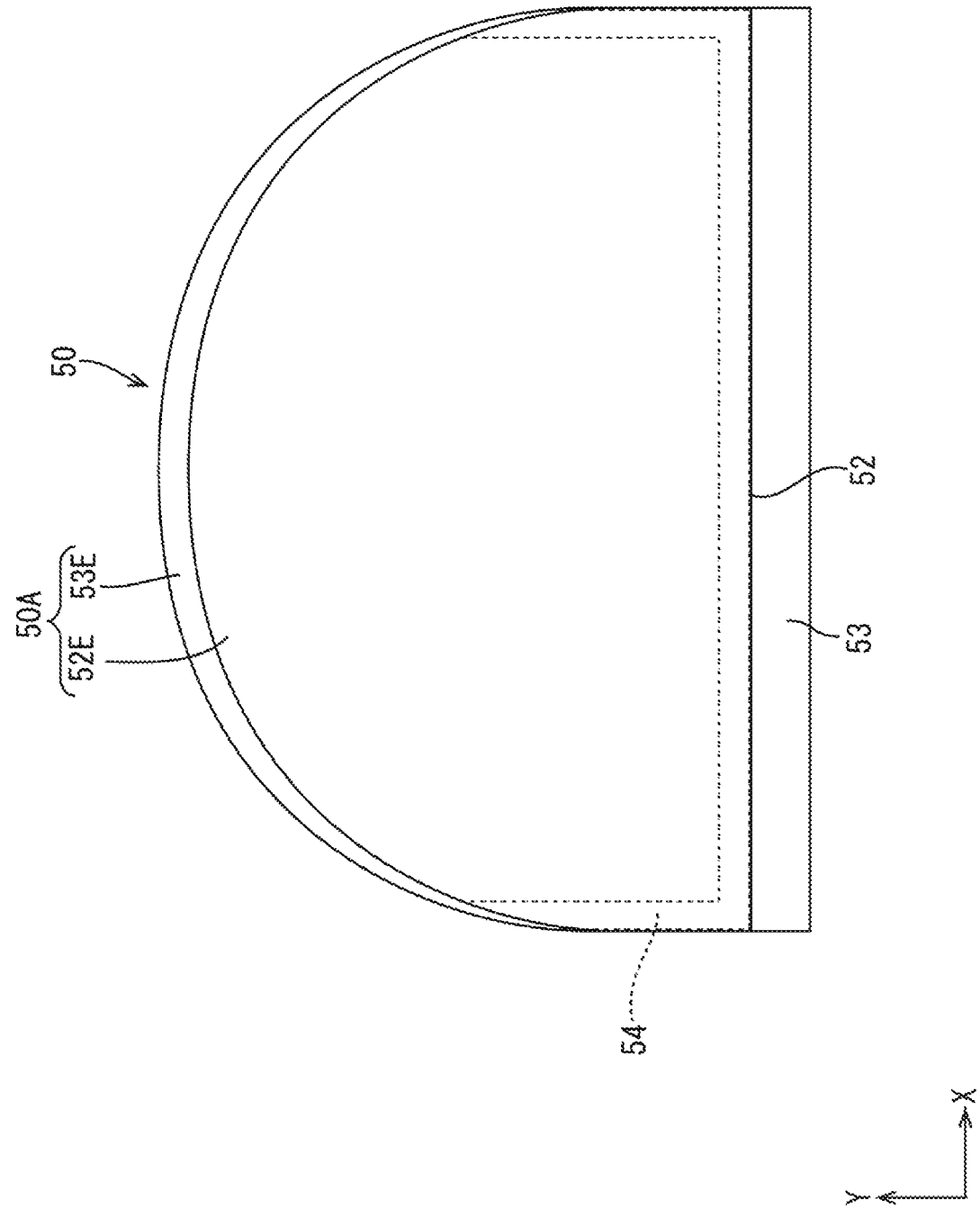
FIG. 12 is a plan view of the common liquid crystal panel after cutting.

With either one of the scribing method with a scribing wheel and the laser scribing method, scribing lines (cutting lines) L10, L11 are formed on the array substrate 53 side and the CF substrate (the counter substrate) 52 side at a distance as illustrated in FIG. 11. The distance is about 0.2 mm to 2 mm, for example. Such a distance is provided between the scribing lines L10, L11 such that a film surface of the array substrate 53 is exposed and an electrode pattern (lines) on the array substrate 53 can be easily cut with a laser beam. Therefore, the film surface of the array substrate 53 is preferably exposed in an area of at least about one pixel or preferably about three pixels or more. A pixel size differs in every type of the liquid crystal panel 10 and the pixel size is preferably about 0.2 mm or more while considering position accuracy of the scribing. If the distance is too large, the area between the scribing line L10 of the array substrate 53 and the scribing line L11 of the CF substrate 52 is large. The portions of the substrates between the scribing lines L10, L11 are bonded to some extent with a surface tension of the liquid crystals. Therefore, it may be difficult to penetrate the crack from the scribing line L11 of the CF substrate (the counter substrate) 52 and further remove an edge portion. Therefore, it is desirable to set the distance between the scribing lines L10, L11 to about 2 mm or less.

In this embodiment, as illustrated in FIG. 11, the scribing lines L10, L11 cross the sealing material 54 formed in a quadrangular frame shape. Namely, a part of the sealing material 54 is cut and removed. Therefore, a part of the liquid crystal layer enclosed within the frame-shaped sealing material 54 is cut and removed. A part of the common liquid crystal panel 50 illustrated in FIG. 11 inside the scribing lines L10, L11 will be finally the semicircular liquid crystal panel 10. A part of the common liquid crystal panel 50 outside the scribing lines L10, L11 will be removed from the common liquid crystal panel 50 as an extra portion M.

The common liquid crystal panel 50 that is cut as described above has a sealing material removed edge portion 50A at which a part of the sealing material 54 is removed. As described in FIG. 12, the sealing material removed edge portion 50A includes a processed edge portion (an edge portion) 52E of the CF substrate 52 and a processed edge portion (an edge portion) 53E of the array substrate 53 and has an arched (curved) plan view shape along the scribing lines L10, L11. In the deformation cutting process, the common liquid crystal panel 50 is cut such that the processed edge portion 53E of the array substrate 53 of the sealing material removed edge portion 50A projects outward from the processed edge portion 52E of the CF substrate 52. Namely, the sealing material removed edge portion 50A has a step such that the processed edge portion 53E of the array substrate 53 projects outward and the processed edge portion 52E of the CF substrate 52 is recessed inward. Therefore, the processed edge portion 53E of the array substrate 53 is away outward from the liquid crystal layer 51 remaining after the cutting and is not covered with the processed edge portion 52E of the CF substrate 52 and exposed outside. The processed edge portion 53E of the array substrate 53 projects outward from the processed edge portion 52E of the CF substrate 52 by a projecting dimension of about 0.05 mm (substantially same as a dimension of one pixel) to 2 mm, for example. If the projecting dimension is substantially same as the dimension of one pixel, the lines are easily cut in a line correction process, which will be described later. Therefore, the projecting dimension is preferably about 2 mm at most. To form a step at the sealing material removed edge portion 50A as described above, the CF substrate 52 and the array substrate 53 are scribed with the scribing wheel and then subjected to the break process.

(Line Correcting Process of Lines)

As described before, if the common liquid crystal panel 50 is cut, a layer structure of the array substrate 53 may be crushed (insulation between the cross points established by the insulation layer may be destroyed) near the sealing material removed edge portion 50A (near the scribing lines L10, L11) and the lines 55, 56, 59 near the processed edge portion 53E may be short-circuited. If insulation is destroyed and short-circuit is caused at the cross point of certain gate lines 55 and the source lines 56 or a cross point of the source lines 56 and the capacitance lines 59, all of the TFTs 32 connected to the gate lines 55 or the source lines 56 in which the short-circuit is caused cannot be operated and a linear display error may be recognized by a user. In this embodiment, to solve such a problem, the line correction process of correcting the lines 55, 56, 59 is performed after the cutting process. In the line correction process, the liens 55, 56, 59 that may have problems such as short-circuit are corrected such that display errors due to the cutting in the cutting process are less likely to be caused.

Figure 13:
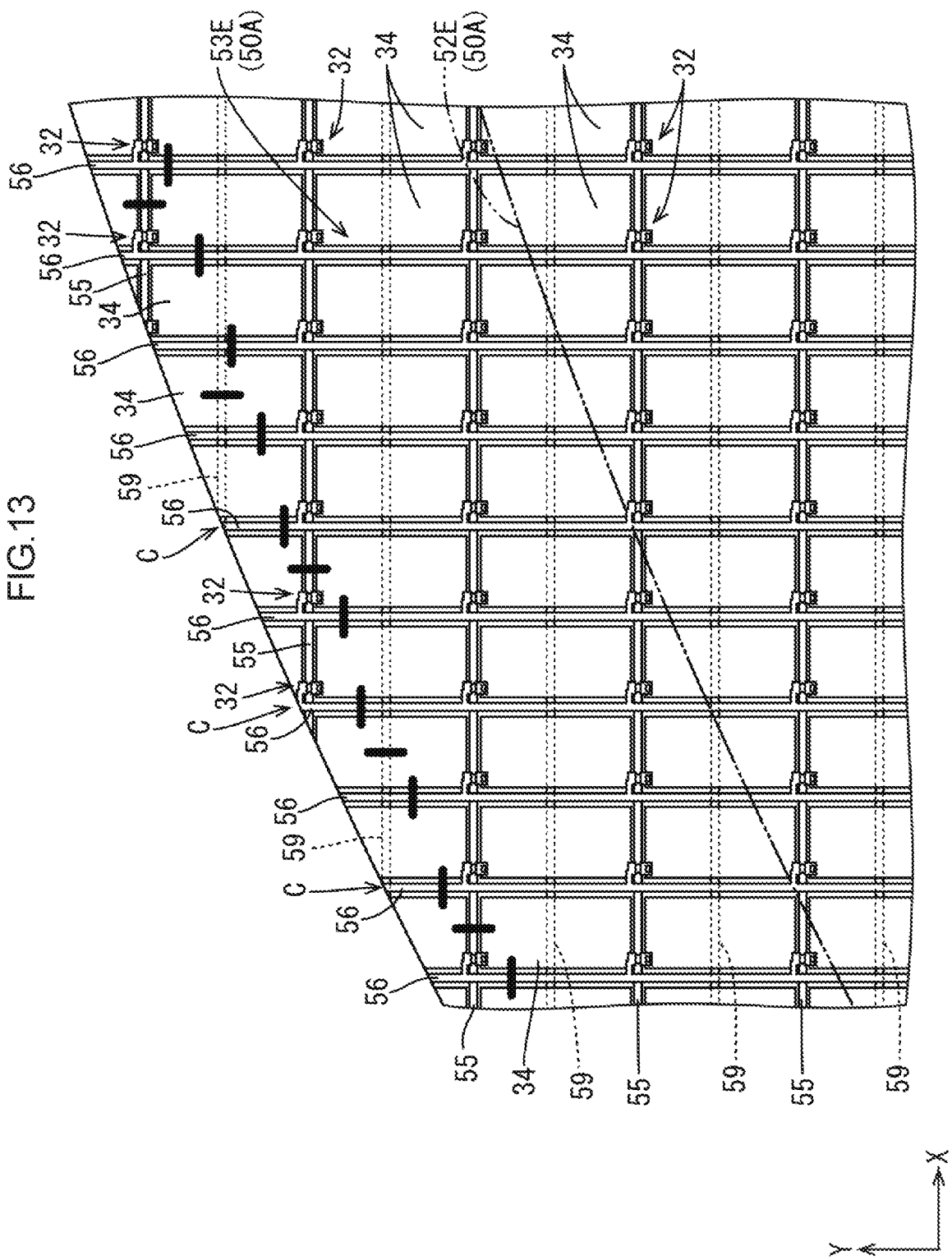
FIG. 13 is a plan view illustrating the common liquid crystal panel after cutting including an end portion of the array substrate where lines are corrected.

Specifically, in the line correction process, a laser beam irradiation device (a correcting device), which is not illustrated, is used to cut a certain part of the lines 55, 56, 59 disposed on the processed edge portion 53E of the array substrate 53. In detail, as illustrated in FIG. 13, in correcting the lines, the portions of the lines 55, 56, 59, which are disposed on the processed edge portion 53E of the array substrate 53, near the scribing lines L10, L11 are irradiated with a laser beam to cross the portions. Accordingly, the lines 55, 56, 59 are cut at the laser irradiation portions. In FIG. 13, laser irradiation traces are illustrated with bold lines crossing the lines 55, 56, 59 and an edge surface of the processed edge portion 52E of the CF substrate 52 is illustrated with a two-dot chain line. The cross point of the gate line 55 and the source line 56 or the cross point of the source line 56 and the capacitance line 59 further overlap the scribing lines L10, L11 at an overlapping portion (a short-circuit assumed portion) C. In the overlapping portion C, the layer structure including the insulation layer and the electrode layer at the cross point of the lines 55, 56, 59 is destroyed by cutting (scribing) and short-circuit is likely to be caused at the cross point of the lines 55, 56, 59. However, the portion of the gate line 55, the source line 56, and the capacitance line 59 near the overlapping portion C is cut with the laser beam irradiation so that the rest of the gate line 55, the source line 56, and the capacitance line 59 (the portion on the opposite side from the overlapping portion C with respect to the cut position) can be properly used. The laser beam irradiation position is not necessarily near the overlapping portion C. As long as the line 55, 56, 59 is cut at least at a portion exposing the film surface of the array substrate 53, the display error can be corrected. The lines 55, 56, 59 that are to be corrected in the line correction process are outside the processed edge portion 52E of the CF substrate 52 and are arranged on the processed edge portion 53E that is away from the liquid crystal layer 51. Therefore, even if debris (broken pieces) may be generated according to the laser irradiation on the lines 55, 56, 59, the debris is less likely to be scattered within the liquid crystal layer 51. The line correction process is performed prior to a sealing process, which will be described later. In the line correction process, the lines 55, 56, 59 are irradiated with a laser beam before the processed edge portion 53E of the array substrate 53 is covered with sealing resin R. Therefore, the sealing resin R is less likely to obstruct the correction of the lines, and the line correction can be performed easily and with high reliability.

(Sealing Process of Sealing Liquid Crystal Layer with Supplemental Sealing Material)

As described before, after the deformation cutting process is performed and the extra portion M is removed from the common liquid crystal panel 50, a part of the quadrangular frame-shaped sealing material 54 is removed and a part of the liquid crystal layer 51 that is between the CF substrate 52 and the array substrate 53 of the common liquid crystal panel 50 is exposed to outside. Sealing material 42 is additionally used to seal the liquid crystal layer 51 that is exposed between the processed edge portion 52E of the CF substrate 52 and the processed edge portion 53E of the array substrate 53 at the sealing material removed edge portion 50A without having the sealing material 54 in the processed edge portion of the common liquid crystal panel 50. The sealing material 42 that is additionally supplied later is referred to as supplemental sealing material 42 in this specification. The portion of the frame-shaped sealing material 54 of the common liquid crystal panel 50 is not removed after the cutting process and remains. Such a remaining sealing material is referred to as basic sealing material 41.

Figure 14:
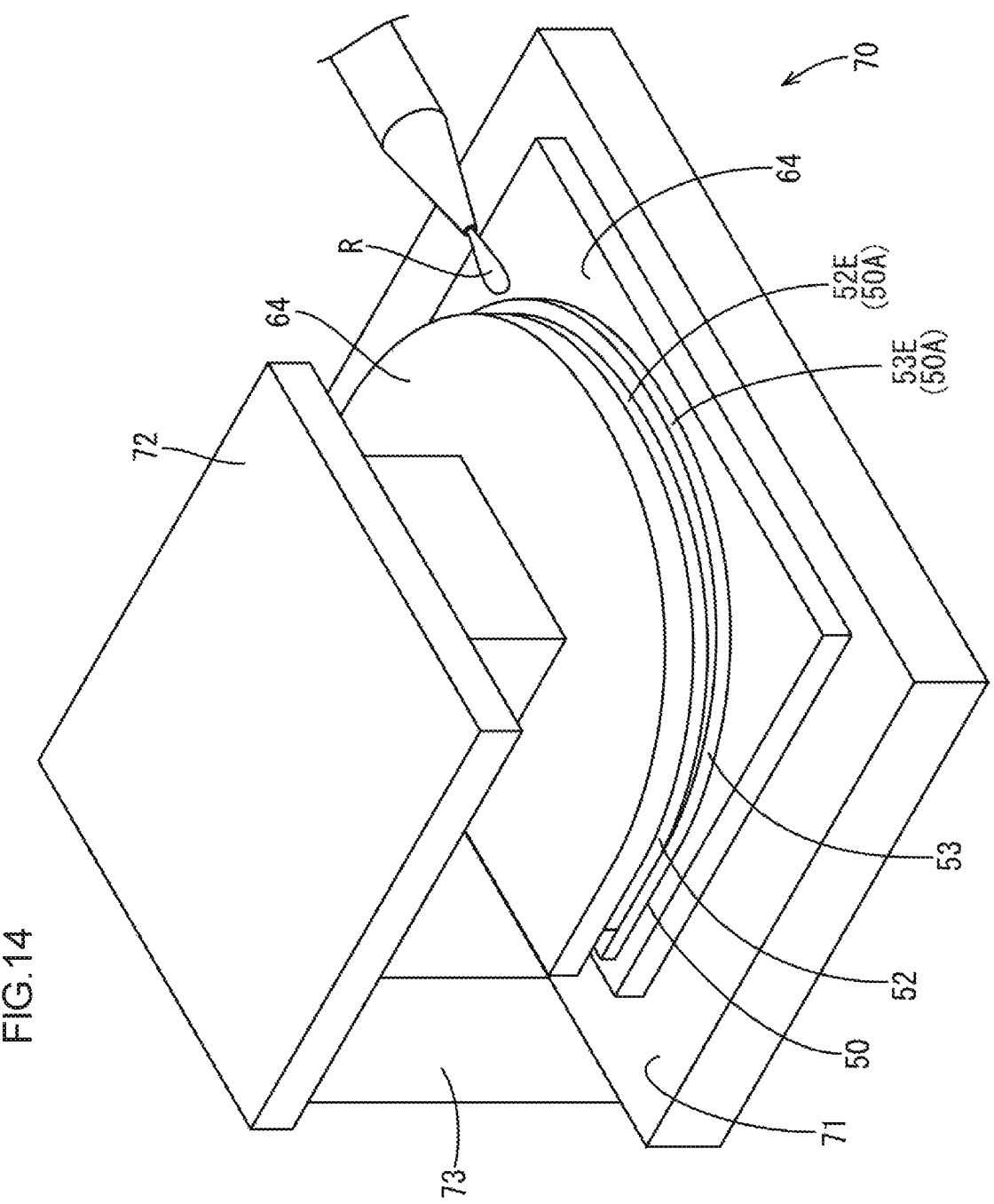
FIG. 14 is a view illustrating that sealing material removed edge portion of the common liquid crystal panel after deformation cutting is sealed with supplemental sealing material.

As illustrated in FIG. 14, the sealing material removed edge portion 50A is coated with the sealing resin R. Photosetting acrylic resin is used as the sealing resin R. The photosetting acrylic resin may be used to seal an inlet that is formed in the liquid crystal panel and through which the liquid crystals are supplied into the liquid crystal panel with vacuum injection. Such photosetting acrylic resin is advantageous in less adverse influence on the liquid crystal layer. The sealing resin R that is not cured is supplied on the sealing material removed edge portion 50A to surround the liquid crystal layer 51 (a liquid crystal layer 18) while forming a frame shape with the remaining basic sealing material 41 that is not removed from the sealing material 54. When the sealing resin R is supplied to the sealing material removed edge portion 50A, the common liquid crystal panel 50 is between the pair of dummy boards (dummy glasses) 64 and held by a pressing jig 70 while being pressed in a thickness direction. The dummy board 64 is made of glass and has a thickness greater than the support substrate 52A, 53A of the common liquid crystal panel 50. The thickness of the dummy board 64 is about 1 mm to 10 mm such that the dummy board 64 is less likely to be deformed. The pressing jig 70 at least includes a stage 71, a pressing portion 72, and a support portion 73. The common liquid crystal panel 50 sandwiched between the dummy boards 64 is placed on the stage 71. The dummy boards 64 and the common liquid crystal panel 50 are held between the stage 71 and the pressing portion 72 and the pressing portion 72 presses the common liquid crystal panel 50. The support portion 73 connects and supports the stage 71 and the pressing portion 72. The stage 71 and the dummy board 64 that is in contact with the array substrate 53 are larger than the common liquid crystal panel 50 in a plan view. According to such a configuration, the common liquid crystal panel 50 can be properly and surely supported. An interleaf, which is not illustrated, is between each dummy board 64 and the common liquid crystal panel 50 and with such a configuration, the support substrate 52A, 53A is less likely to be damaged by minute dust that may be present between the dummy board 64 and the common liquid crystal panel 50.

In the sealing process, in the sealing material removed edge portion 50A, the sealing resin R is disposed with coating on the processed edge portion 53E of the array substrate 53 that projects outward than the processed edge portion 52E of the CF substrate 52 (refer FIG. 2). Accordingly, the sealing resin R is less likely to be supplied to an outside of the processed edge portion 53E of the array substrate 53 and the sealing resin R is less likely to be put on an edge surface or an outer plate surface of the array substrate 53. Therefore, an outer appearance is good and bonding of the polarizing plate 10D is effectively performed. Furthermore, the sealing resin R covers and protects the exposed film surface of the array substrate 53. Accordingly, the exposed film surface of the array substrate 53 is less likely to be damaged during the producing process and another display error is less likely to be caused.

After the sealing resin R is put on the sealing material removed edge portion 50A, the pressure of the pressing jig 70 is lowered. According to the lowering of the pressure of the pressing jig 70, the pressure applied to the common liquid crystal panel 50 in the thickness direction is released. Therefore, a space between the processed edge portion 52E of the CF substrate 52 (the CF substrate 20) and the processed edge portion 53E of the array substrate 53 (the array substrate 30) is filled with the sealing resin R that is put on the sealing material removed edge portion 50A such that a part of the uncured sealing resin R having fluidity is pulled therein. Thereafter, the sealing resin R is irradiated with light such as ultraviolet light rays and cured (a curing process). The common liquid crystal panel 50 may be taken out from the pressing jig 70 in the curing process. If the sealing resin R is finally cured, the cured portion becomes the supplemental sealing material 42 and the supplemental sealing material 42 and the basic sealing material 41 configure the frame-shaped sealing material 40 extending along the semicircular outline. In the sealing process, the sealing resin R is supplied on the sealing material removed edge portion 50A to seal the space between the processed edge portions 52E, 53E of the pair of substrates (the CF substrate 52 and the array substrate 53) and seal the liquid crystal layer 51 (the liquid crystal layer 18) together with the remaining sealing material (the basic sealing material 41).

Figure 15:
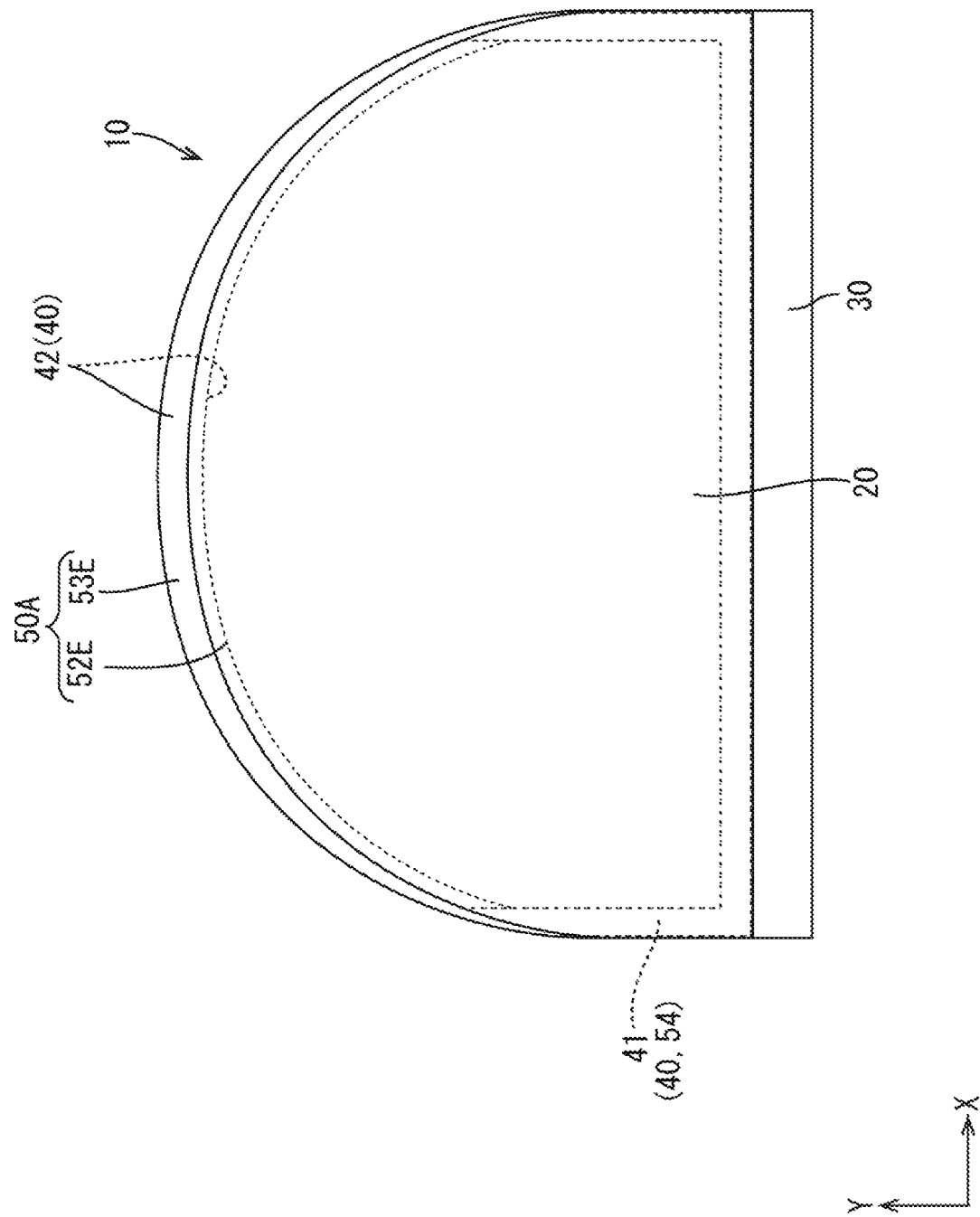
FIG. 15 is a plan view illustrating a liquid crystal panel obtained by sealing the sealing material removed edge portion of the common liquid crystal panel with sealing resin.

As illustrated in FIG. 15, the whole sealing material of the liquid crystal panel 10 has a frame shape extending along the outline of the liquid crystal panel 10. The portion of the sealing material 40 disposed on the rectangular side of the liquid crystal panel 10 is mainly formed from the sealing material 54 of the common liquid crystal panel 50. The portion of the sealing material 40 disposed on the semicircular side of the liquid crystal panel 10 is mainly formed from the supplemental sealing material 42 that is formed from cured sealing resin R. Thus, the semicircular liquid crystal panel 10 is produced from the quadrangular common liquid crystal panel 50 with using the pressing jig 70.

As described before, the method of producing a liquid crystal panel 10 of this embodiment is a method of producing the liquid crystal panel 10 having a non-quadrangular outline. The method includes the common liquid crystal panel producing process of producing the common liquid crystal panel 50, the cutting process, the line correction process, and the sealing process. In the common liquid crystal panel producing process, the common liquid crystal panel 50 is produced and the common liquid crystal panel 50 at least includes the array substrate (the line substrate) 53 having the lines 55, 56, 59 thereon, the liquid crystal layer 51, the CF substrate (the counter substrate) 52 opposite the array substrate 53 having the liquid crystal layer 51 therebetween, and the frame-shaped sealing material 54 sandwiched between the array substrate 53 and the CF substrate 52 and surrounding and sealing the liquid crystal layer 51. In the cutting process, the common liquid crystal panel 50 is cut along the scribing lines (the cutting lines) L10, L11 extending along the outline such that a part of the sealing material 54 is removed and the remaining part of the sealing material 54 is left, and a part of the sealing material 54 is removed from the array substrate 53 and the CF substrate 52 to expose the liquid crystal layer 51 and the sealing material removed edge portion 50A including the processed edge portions (the edge portions) 52E, 53E of the array substrate and the CF substrate 52 is formed on the common liquid crystal panel 50. In the line correction process, the lines 55, 56, 59 near the processed edge portion 53E of the array substrate 53 are corrected. In the sealing process, the sealing resin R is supplied on the sealing material removed edge portion 50A to close the space between the processed edge portions 52E, 53E of the array substrate 53 and the CF substrate 52 and seal the liquid crystal layer 51 together with the remaining portion of the sealing material 54.

First, the common liquid crystal panel 50 is produced in the common liquid crystal panel producing process. In the cutting process, the common liquid crystal panel 50 is cut along the scribing lines L10, L11 that are along the non-quadrangular outline and a part of the sealing material 54 is removed and a remaining part of the sealing material remains. Through the cutting process, the sealing material removed edge portion 50A is formed on the common liquid crystal panel 50 such that the sealing material removed edge portion 50A includes the processed edge portions 52E, 53E of the array substrate 53 and the CF substrate 52 from which the part of the sealing material 54 is removed to expose the liquid crystal layer 51. Near the sealing material removed edge portion 50A, the layer structure of the array substrate 53 may be destroyed by cutting and short-circuit may be caused at the lines 55, 56, 59 near the processed edge portion 53E of the array substrate 53. Even in such a case, the lines 55, 56, 59 where problems such as short-circuit may be caused are corrected in the line correction process, and the display error due to the short-circuit that may be caused in the cutting process is less likely to be caused. In the sealing process, the sealing resin R is supplied on the sealing material removed edge portion 50A to seal the liquid crystal layer 51. Accordingly, the liquid crystal panels 10 having various kinds of deformed shapes are effectively produced.

In the cutting process, the common liquid crystal panel is cut such that the processed edge portion 53E of the array substrate 53 projects outward than the processed edge portion 52E of the CF substrate. In the line correction process, the lines 55, 56, 59 disposed near the processed edge portion 53E of the array substrate 53 that is outside the processed edge portion 52E of the CF substrate 52 are corrected. Namely, the correction of the lines 55, 56, 59 on the array substrate 53 in the line correction process is performed away from the liquid crystal layer 51. Therefore, debris that may be generated according to the correction of the lines 55, 56, 59 is less likely to be scattered within the liquid crystal layer 51.

In the sealing process, the sealing resin R is disposed with coating on the processed edge portion 53E of the array substrate 53 that is outside the processed edge portion 52E of the CF substrate. Accordingly, the sealing resin R supplied in the sealing process is less likely to spread outside the processed edge portion 53E of the array substrate 53.

The sealing process is performed after the line correction process. Therefore, the sealing process is performed after the line correction process. Compared to the method in which the processes are performed in a reversed order, the correction of the lines 55, 56, 59 in the line correction process is less likely to be obstructed by the sealing resin R. Therefore, the lines 55, 56, 59 are corrected easily with high reliability.

In the line correction process, the parts of the lines 55, 56, 59 that are adjacent to the scribing lines L10, L11 are cut. Accordingly, after the cutting, problems such as short-circuit are less likely to be caused in the portions of the lines 55, 56, 59 on the array substrate 53 near the scribing lines L10, L11. In the line correction process, the portions of the lines 55, 56, 59 near the scribing lines L10, L11 are cut such that the remaining portions of the lines 55, 56, 59 are separated from the portions in which a problem such as short-circuit is caused. Therefore, the remaining portions of the lines 55, 56, 59 can be normally used.

In the common liquid crystal panel producing process, the TFTs (the switching components) 32 connected to the lines 55, 56, the pixel electrodes 34 connected to the TFTs 32, and the common electrodes 33 disposed over the respective pixel electrodes 34 are at least formed on the array substrate 53. Accordingly, the common liquid crystal panel 10 produced in the common liquid crystal panel 10 producing process includes the pixel electrodes 34 connected to the TFTs 32 and the common electrodes 33 disposed over the respective pixel electrodes 34 on the array substrate 53 and the common electrodes 33 are not formed on the CF substrate 52. If the pixel electrodes 34 are formed on the array substrate and the common electrodes 33 are formed on the CF substrate, a following problem may be caused. If roughness is caused on a cut surface of the processed edge portion of the array substrate according to the cutting performed in the cutting process, the pixel electrodes 34 and the lines 55, 56, 59 on the array substrate and the common electrodes 33 on the CF substrate may be short-circuited. On the other hand, in the configuration including the pixel electrodes 34 and the common electrodes 33 collectively on the array substrate 53, even if roughness is caused on a cut surface of the processed edge portion 53E of the array substrate 53 according to the cutting performed in the cutting process, the above-described short-circuit is less likely to be caused.

In the common liquid crystal panel producing process, the monolithic gate drivers 57 are dispersedly arranged inside the sealing material 54 on the array substrate 53. Accordingly, the liquid crystal panel 10 having the non-quadrangular outline is produced easily from the liquid crystal panel 10 including such an array substrate 53.

Second Embodiment

A second embodiment will be described with reference to FIGS. 16 to 18. In the second embodiment, a common liquid crystal panel 150 includes scribing lines L110, L111. Configurations, operations, and effects same as those of the first embodiment will not be described.

Figure 16:
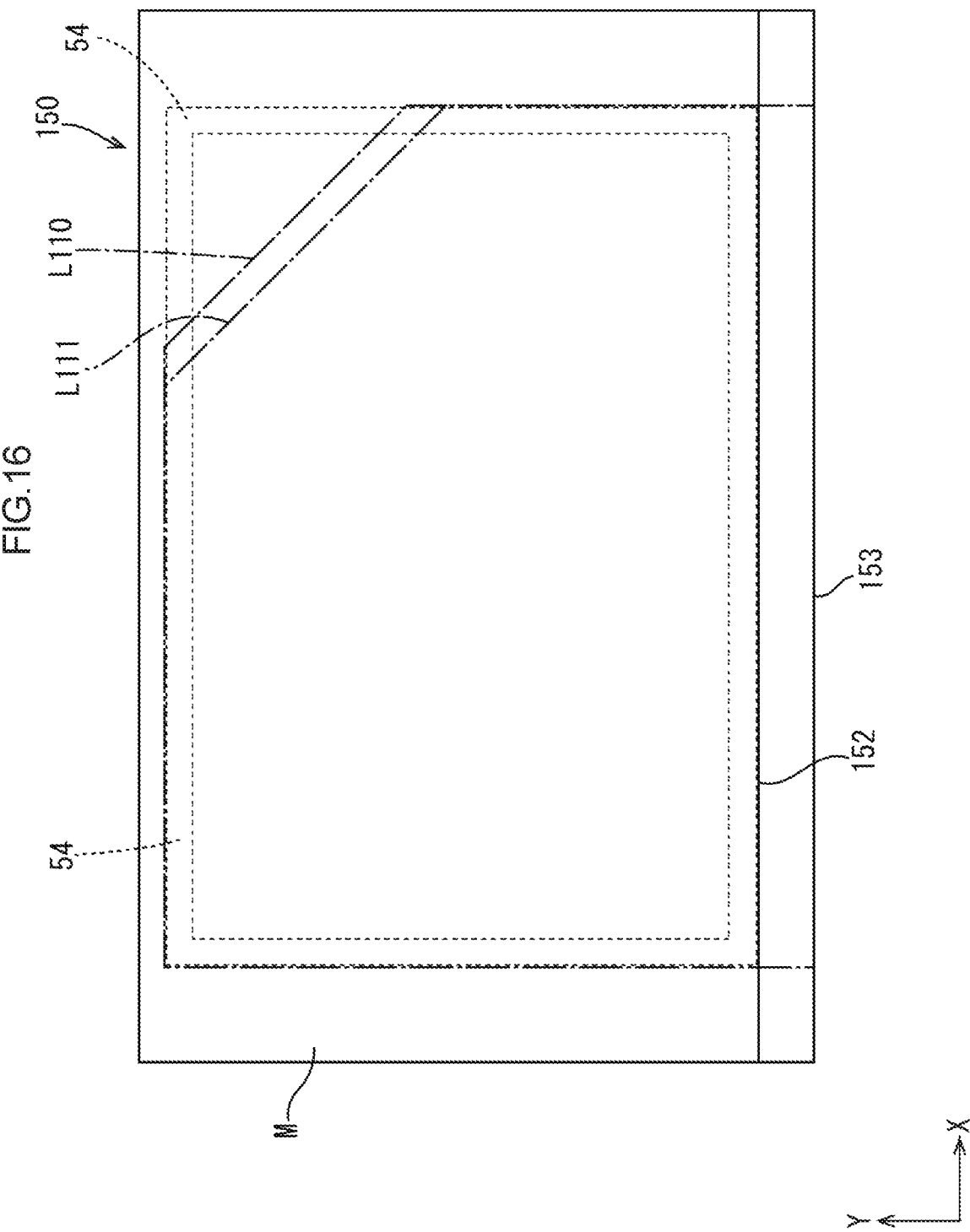
FIG. 16 is a plan view of a common liquid crystal panel having scribing lines along an outline of a liquid crystal panel according to a second embodiment of the present technology.
Figure 17:
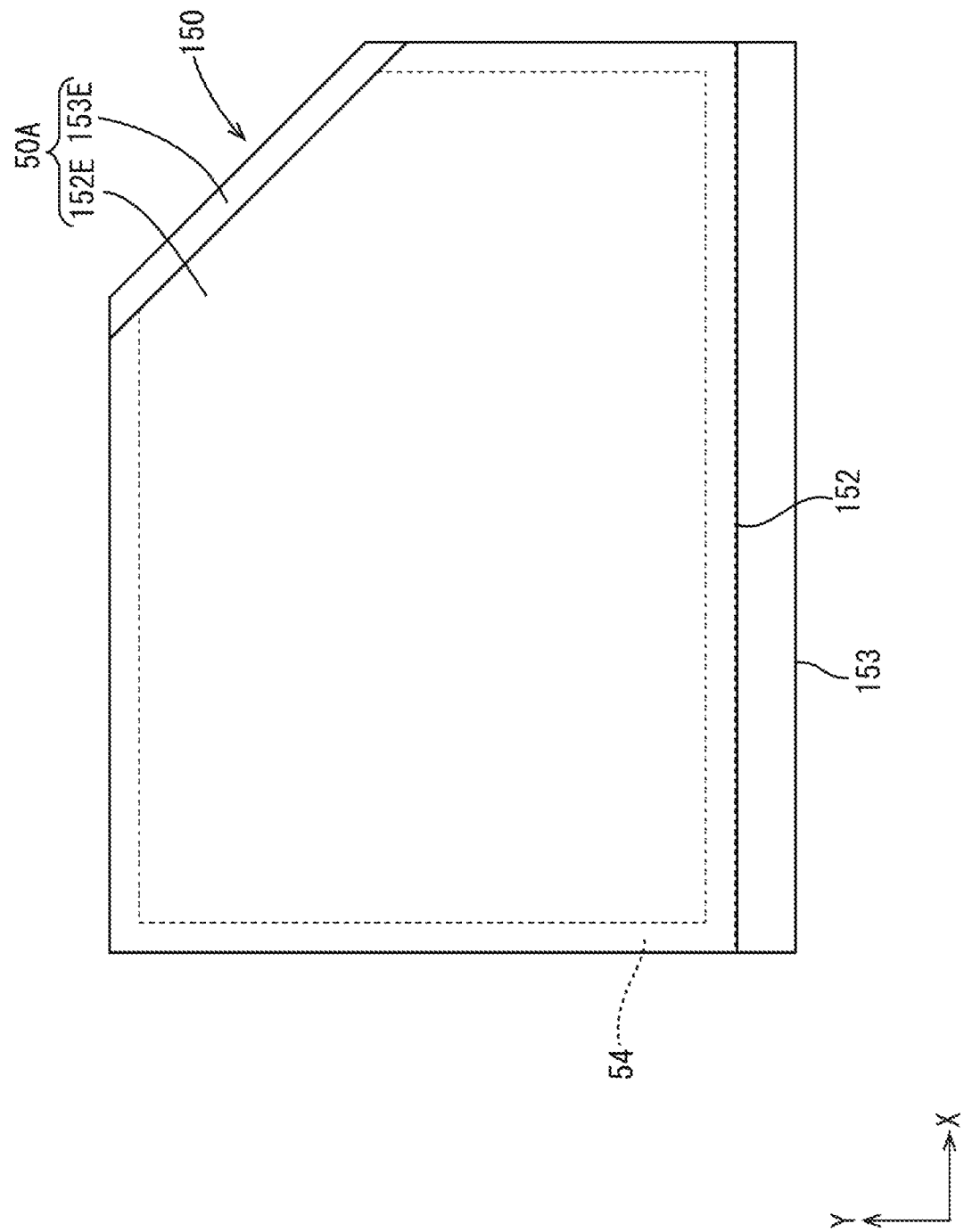
FIG. 17 is a plan view of a common liquid crystal panel after cutting.
Figure 18:
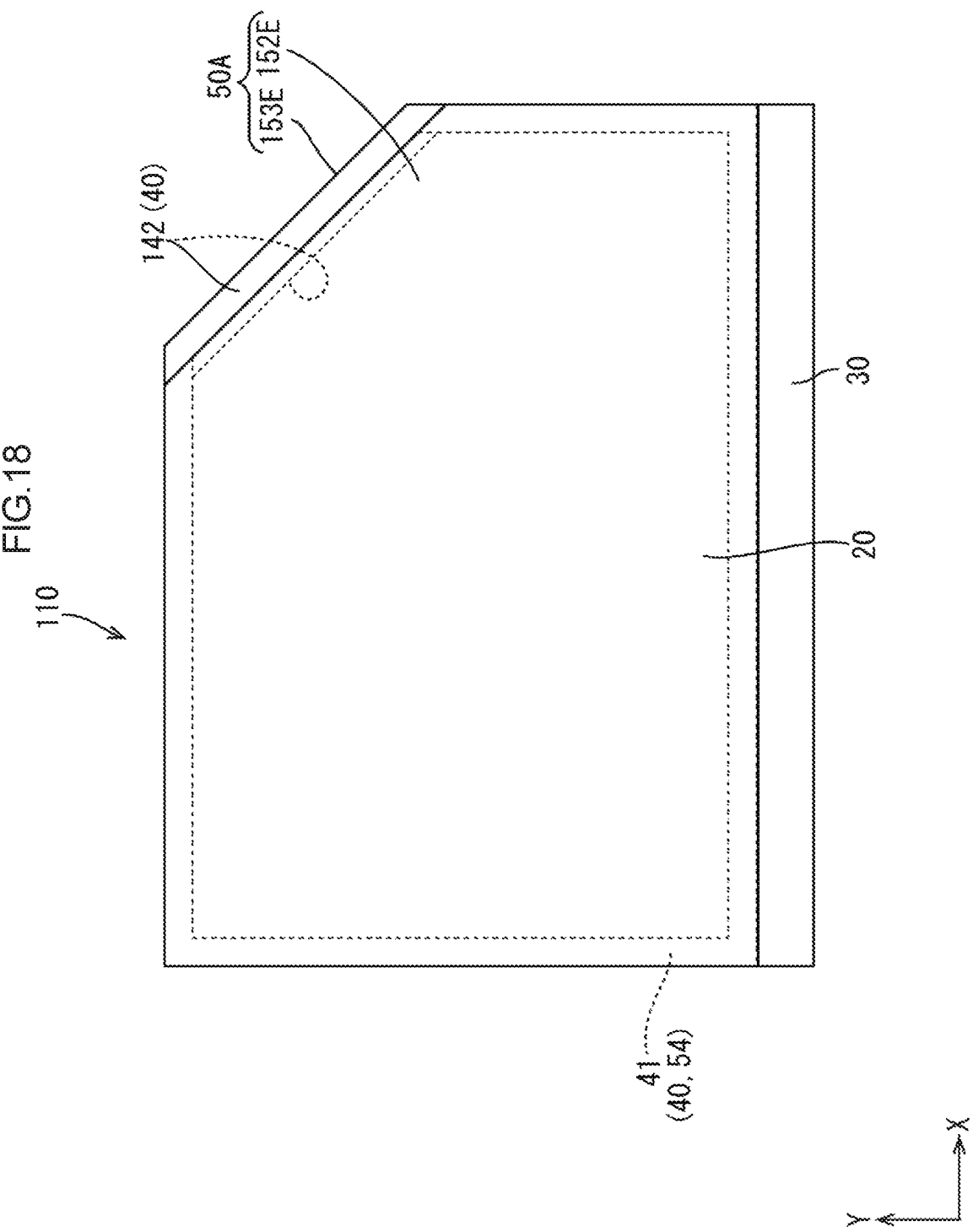
FIG. 18 is a plan view of a liquid crystal panel obtained by a sealing material removed edge portion of the common liquid crystal panel with sealing resin.

In this embodiment, as illustrated in FIGS. 16 and 17, in the cutting process, the common liquid crystal panel 150 having a laterally-elongated rectangular shape is cut along oblique scribing lines L110, L111 such that a corner portion of the common liquid crystal panel 150 is cut off. Specifically, the scribing lines L110, L111 are inclined lines inclined with respect to the X-axis direction and the Y-axis direction such that a triangular corner portion of the common liquid crystal panel 150 that is on an opposite side from a terminal (not illustrated) side with respect to the Y-axis direction is cut off. In such a method, the common liquid crystal panel 150 is cut such that a processed edge portion 153E of an array substrate 153 is on an outer side than a processed edge portion 152E of a CF substrate 152, and after such a cutting process, the line correction process similar to the first embodiment is performed. In the line correction process, each of the lines (not illustrated) arranged near the straight scribing lines L110, L111 extending obliquely is irradiated with a laser beam and cut. Thereafter, after performing the sealing process, a liquid crystal panel 110 having an outline such that a corner portion of the laterally-elongated rectangular shape is cut off is obtained as illustrated in FIG. 18.

Third Embodiment

A third embodiment will be described with reference to FIGS. 19 to 21. In the third embodiment, arrangement of a gate driver 257 is different from that in the second embodiment. Configurations, operations, and effects same as those of the second embodiment will not be described.

Figure 19:
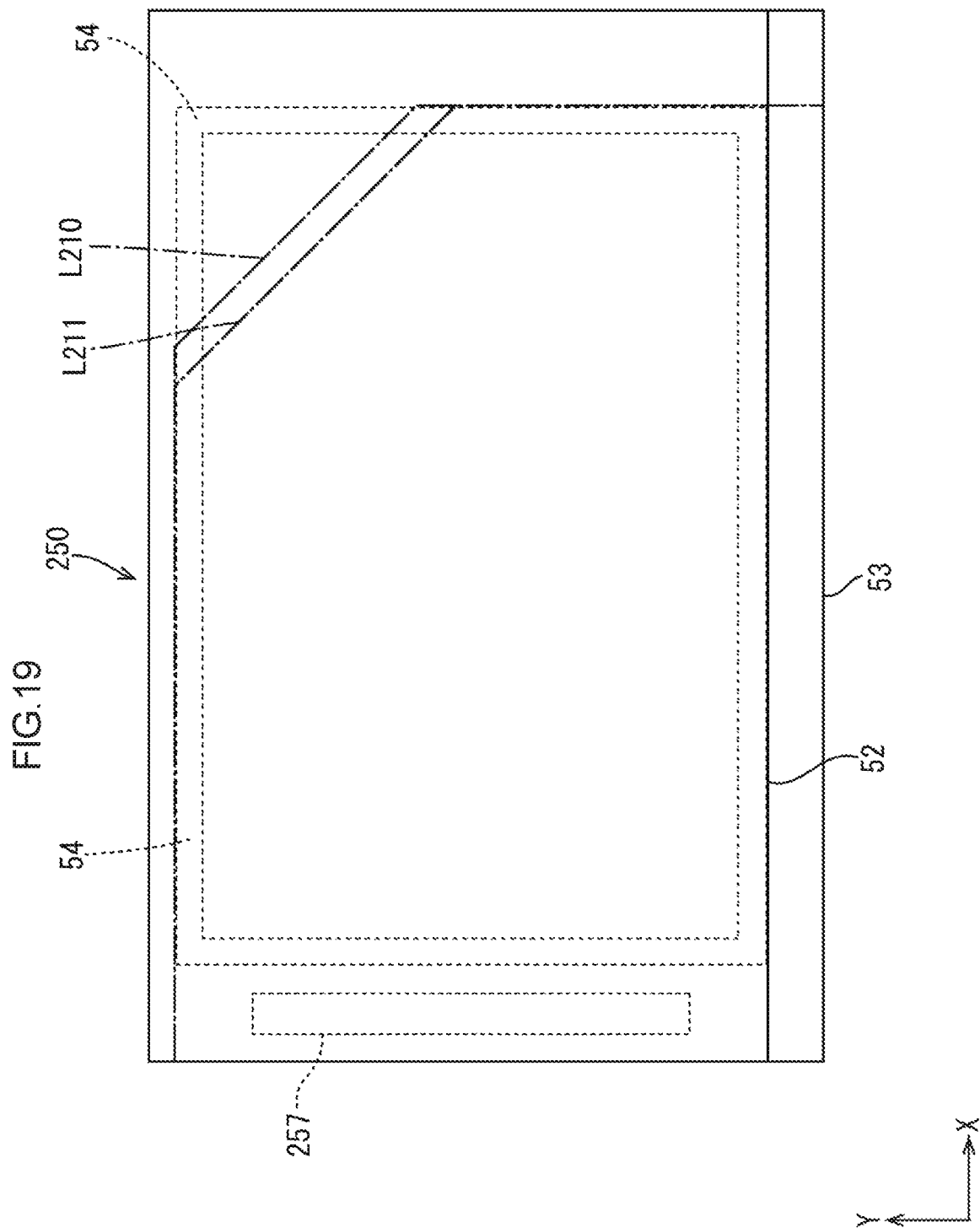
FIG. 19 is a plan view of a common liquid crystal panel having scribing lines along an outline of a liquid crystal panel according to a third embodiment of the present technology.

As illustrated in FIG. 19, the gate driver 257 of this embodiment is arranged on an edge portion of a common liquid crystal panel 250 that is on an opposite side (a left side in FIG. 19) with respect to the X-axis direction from a portion to be cut side (a right side in FIG. 19) that is to be cut along the scribing lines L210, L211. The gate driver 257 is arranged on an outer side from sealing material 240 with respect to the X-axis direction and is connected to gate lines (not illustrated) crossing the sealing material 240 and extending outside the sealing material 240. According to such a configuration, scanning signals are input to the gate lines through the gate driver 257.

Figure 20:
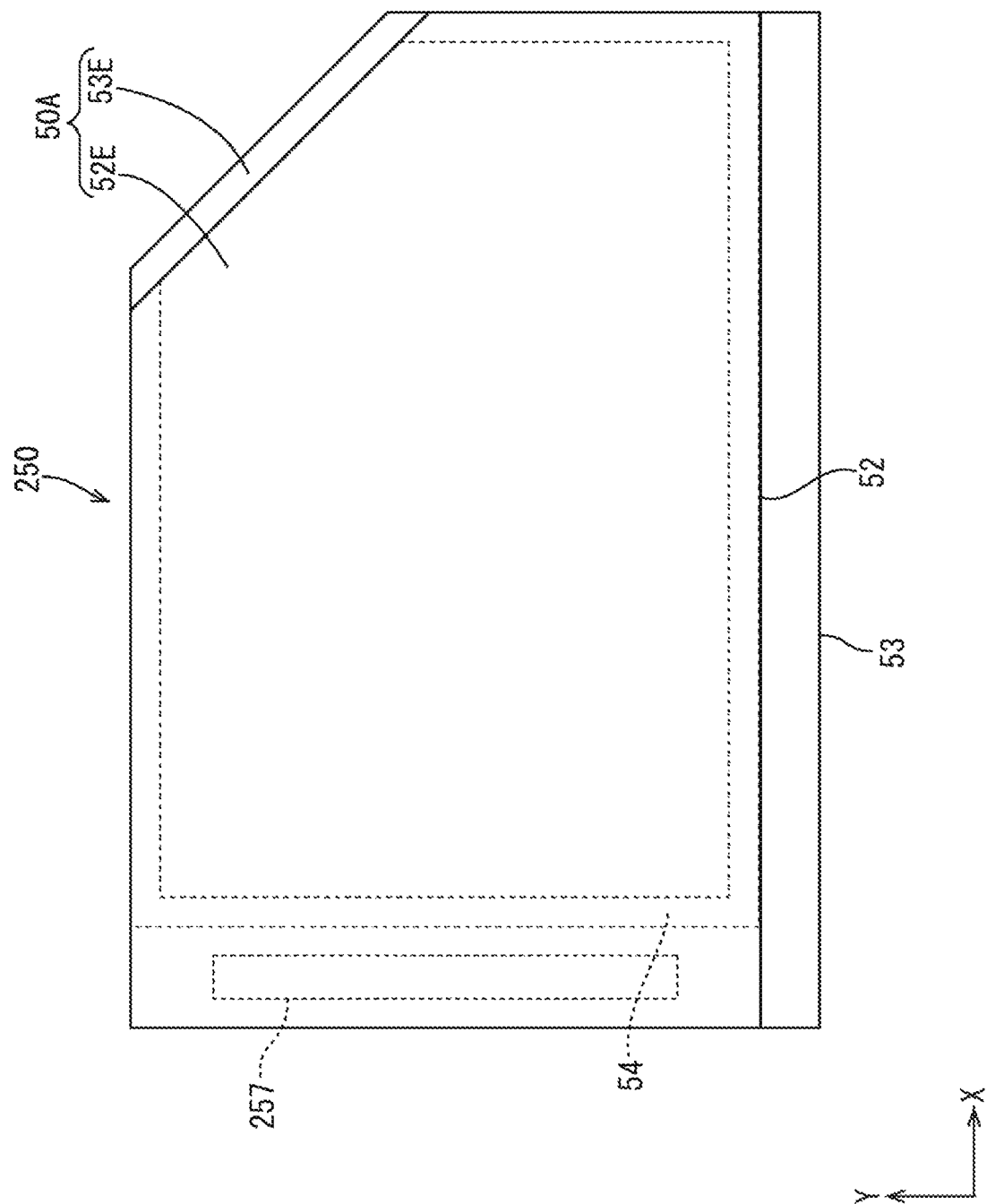
FIG. 20 is a plan view of a common liquid crystal panel after cutting.

In the cutting process of this embodiment, as illustrated in FIGS. 19 and 20, the common liquid crystal panel 250 is cut along the oblique scribing lines L210, L211 such that a corner portion thereof on an opposite side (a right side in FIGS. 19 and 20) from the gate driver 257 side (a left side in FIGS. 19 and 20) with respect to the X-axis direction is cut off. As illustrated in FIG. 21, in the liquid crystal panel 210 produced by the above cutting, the scanning signals from the gate driver 257 are normally supplied to all the TFTs (not illustrated) within the display section of the liquid crystal panel 210.

Other Embodiments

The present invention is not limited to the embodiments, which have been described using the foregoing descriptions and the drawings. For example, embodiments described below are also included in the technical scope of the present invention.

(1) In each of the above embodiments, in the cutting process, the projecting dimension of the processed edge portion of the array substrate with respect to the processed portion of the CF substrate is from 0.05 mm (or a dimension of substantially one pixel) to 2 mm. However, the projecting dimension may be smaller than 0.05 mm or greater than 2 mm. If the projecting dimension is about a dimension of one pixel, the lines are easily cut with a laser beam.

(2) In each of the above embodiments, the cutting is performed such that processed edge portion of the array substrate is on an outer side from the processed edge portion of the CF substrate in the cutting process. However, in the cutting process, the cutting may be performed such that edge surfaces of the processed edge portions of the array substrate and the CF substrate may be flush with each other (this may be possible if the scribing lines are short or the number of shots of s laser beam is small). In such a method, the laser irradiation area on the array substrate in the line correction process is preferably within an area in which the sealing resin (supplemental sealing material) is to be disposed in a subsequent sealing process such that the debris is less likely to spread to the liquid crystal layer.

(3) Other than each of the above embodiments, the specific cutting position of each of the lines that is to be cut with a laser beam in the line correction process may be altered as appropriate.

(4) In each of the above embodiments, the line correction process is performed after the cutting process and thereafter, the sealing process is performed. However, the sealing process may be performed after the cutting process and thereafter, the line correction process may be performed.

(5) Other than each of the above embodiments, the specific planar shape of the scribing lines on the common liquid crystal panel (a specific planar shape of a non-quadrangular liquid crystal panel to be produced) may be altered as appropriate. For example, the scribing lines may have a semi-elliptic shape or a curved outer shape with wavy lines. However, the common liquid crystal panel may preferably have a straight linear outline on a side portion where the terminals are arranged.

(6) Other than each of the above embodiments, the planar arrangement or the number of gate drivers in the display section or the non-display section may be altered as appropriate.

(7) In each of the above embodiments, the liquid crystal panel of the FFS mode is produced. The display mode of the liquid crystal panel to be produced may be a twisted nematic (TN) mode, an in-plane switching (IPS) mode, a multi-domain vertical alignment (MVA) mode, a patterned vertical alignment (PVA) ode, or a continuous pinwheel alignment (CPA) mode in addition to the FFS mode. The liquid crystal panel of the IPS mode includes the pixel electrodes and the common electrodes on the array substrate side and such a configuration is common to the liquid crystal panel of the FFS mode. Therefore, even if roughness is caused on a cut surface of the processed edge portion of the array substrate according to the line correction, the short-circuit between the array substrate side and the CF substrate side is less likely to be caused.

(8) In each of the above embodiments, in the cutting process, the deformation scribing device is used. However, the cutting method and the cutting device used in the cutting process are not limited thereto.

(9) In each of the above embodiments, the common liquid crystal panel has a quadrangular plan view shape. However, it is not limited thereto and a non-quadrangular shaped liquid crystal panel having a non-quadrangular outline and non-quadrangular shaped sealing material may be used as a common liquid crystal panel for producing liquid crystal panels of various kinds of deformed shapes.

(10) In each of the above embodiments, the IC chip (the driver) is directly mounted on the array substrate and a liquid crystal panel is produced with the COG (chip on glass) mounting technology. However, the present invention may be applied to a method of producing a liquid crystal panel of a chip on film (COF) mounting type. In such a liquid crystal panel, a flexible printed circuit board having an IC chip thereon is mounted on the array substrate.

(11) In each of the above embodiments, the TFT includes the oxide semiconductor material as the semiconductor film. Other than this, Polysilicon (polycrystallized silicon (poly-crystalline silicon) such as continuous grain silicon (CG silicon)) or amorphous silicon may be used as the semiconductor film.

(12) Each of the above embodiments includes the TFTs as the switching components of the liquid crystal display device. However, liquid crystal display devices that include switching components other than TFTs (e.g., thin film diodes (TFDs)) may be included in the scope of the present invention. Furthermore, black-and-white liquid crystal display devices, other than color liquid crystal display devices, are also included in the scope of the present invention.

EXPLANATION OF SYMBOLS 10, 110, 210: liquid crystal panel, 18: liquid crystal layer, 20: CF substrate (counter substrate), 30: array substrate (line substrate), 32: TFT (switching component), 33: common electrode, 34: pixel electrode, 40, 240: sealing material, 50, 150: common liquid crystal panel, 50A: sealing material removed edge portion, 51: liquid crystal layer, 52, 152: CF substrate (counter substrate), 52E, 152E: processed edge portion (edge portion), 53, 153: array substrate (line substrate), 53E, 153E: processed edge portion (edge portion), 54: sealing material, 55: gate line (line), 56: source line (line), 57, 257: gate driver, 59: capacitance line (line), L10, L11, L110, L111, L210, L211: scribing line (cutting line), R: sealing resin

The invention claimed is:
1. A method of producing a liquid crystal panel having a non-quadrangular outline, the method comprising:
a common liquid crystal panel producing process of producing a common liquid crystal panel at least including a line substrate having lines thereon, a liquid crystal layer, a counter substrate opposite the line substrate and having the liquid crystal layer therebetween, and sealing material that is formed in a frame shape and between the line substrate and the counter substrate and surrounds and seals the liquid crystal layer;

a cutting process of cutting the common liquid crystal panel along a cutting line that is along the non-quadrangular outline such that a part of the sealing material is removed and a remaining part of the sealing material remains, and forming a sealing material removed edge portion including an edge portion of the line substrate and an edge portion of the counter substrate at which the part of the sealing material is removed to expose the liquid crystal layer;

a line correction process of correcting the line near the edge portion of the line substrate, and a sealing process of providing sealing resin on the sealing material removed edge portion to close a space between the edge portion of the line substrate and the edge portion of the counter substrate and seal the liquid crystal layer with the remaining part of the sealing material, wherein in the cutting process, the common liquid crystal panel is cut such that the edge portion of the line substrate is located outside of the edge portion of the counter substrate.

2. The method according to claim 1, wherein in the sealing process, the sealing resin is disposed with coating on the edge portion of the line substrate that is on the outer side than the edge portion of the counter substrate.

3. The method according to claim 1, wherein the sealing process is performed after the line correction process.

4. The method according to claim 1, wherein in the line correction process, a part of the line that is adjacent to the cutting line is cut.

5. The method according to claim 1, wherein in the common liquid crystal panel producing process, a switching component connected to the line, a pixel electrode connected to the switching component, a common electrode disposed over the pixel electrode are at least formed on the line substrate.

6. The method according to claim 1, wherein in the common liquid crystal panel producing process, monolithic gate drivers are arranged dispersedly on an inner side with respect to the sealing material on the line substrate.

* * * * *